United States Patent
Peng et al.

(10) Patent No.: US 12,302,246 B2
(45) Date of Patent: May 13, 2025

(54) POWER SAVING TECHNIQUES

(71) Applicant: ZTE Corporation, Guangdong (CN)

(72) Inventors: Focai Peng, Guangdong (CN); Mengzhu Chen, Guangdong (CN); Jun Xu, Guangdong (CN); Xuan Ma, Guangdong (CN); Qiujin Guo, Guangdong (CN); Xiaoying Ma, Guangdong (CN)

(73) Assignee: ZTE Corporation, Guangdong (CN)

( * ) Notice: Subject to any disclaimer, the term of this patent is extended or adjusted under 35 U.S.C. 154(b) by 365 days.

(21) Appl. No.: 17/663,918

(22) Filed: May 18, 2022

(65) Prior Publication Data
US 2022/0286964 A1  Sep. 8, 2022

Related U.S. Application Data

(63) Continuation of application No. PCT/CN2020/098905, filed on Jun. 29, 2020.

(51) Int. Cl.
*H04W 52/02*  (2009.01)
*H04W 68/00*  (2009.01)

(52) U.S. Cl.
CPC ... *H04W 52/0229* (2013.01); *H04W 52/0216* (2013.01); *H04W 68/005* (2013.01)

(58) Field of Classification Search
CPC ..... H04W 72/04; H04W 4/00; H04W 72/044; H04W 76/28; H04W 76/27; H04W 64/00; H04L 5/14; H04L 5/00
See application file for complete search history.

(56) References Cited

U.S. PATENT DOCUMENTS

| | | | |
|---|---|---|---|
| 11,818,685 B2 | 11/2023 | Hwang et al. | |
| 2018/0367358 A1 | 12/2018 | Baligh et al. | |
| 2020/0053670 A1 | 2/2020 | Jung et al. | |
| 2020/0092814 A1 | 3/2020 | Zhou et al. | |

(Continued)

FOREIGN PATENT DOCUMENTS

| | | |
|---|---|---|
| CN | 110291750 | 9/2019 |
| CN | 2020/030983 | 2/2020 |

(Continued)

OTHER PUBLICATIONS

Co-pending Japanese Application No. 2022-579732 Office Action mailed on Nov. 24, 2023, 7 pages with unofficial translation.

(Continued)

*Primary Examiner* — Iqbal Zaidi
(74) *Attorney, Agent, or Firm* — Perkins Coie LLP

(57) ABSTRACT

Power saving techniques are described for paging operation. An example wireless communication method includes receiving, by a communication node, a signal-based wake up signal (WUS) that includes L symbols in time domain or a channel-based WUS that is included in a channel, where the signal-based WUS or the channel-based WUS is associated with the communication node or with a group to which the communication node belongs, and where the signal-based WUS or the channel-based WUS includes an indication information that indicates whether the communication node is triggered to monitor a paging occasion, and determining, by the communication node, whether to perform a paging related operation based on the indication information.

21 Claims, 8 Drawing Sheets

(56) References Cited

U.S. PATENT DOCUMENTS

| | | | |
|---|---|---|---|
| 2021/0314925 A1 | 10/2021 | Shin et al. | |
| 2022/0182938 A1* | 6/2022 | Ye | H04W 76/28 |
| 2022/0279447 A1* | 9/2022 | Zhou | H04W 68/00 |

FOREIGN PATENT DOCUMENTS

| | | |
|---|---|---|
| CN | 110839214 | 2/2020 |
| WO | 2019/095331 | 5/2019 |
| WO | 2019/138503 | 7/2019 |
| WO | 2019/158446 A1 | 8/2019 |
| WO | 2020/032740 | 2/2020 |

OTHER PUBLICATIONS

Co-pending EP Application No. 20943680.7 Extended Search Report mailed on Oct. 21, 2022 (11 pages).

EPO, Extended European Search Report for European Application No. 20891181.8, mailed on Jul. 24, 2023, 10 pages.

ZTE Corporation, "Consideration on UE ID of PO calculation for NB-IoT connection to 5GC," 3GPP TSG RAN WG2 #108, Reno, USA, R2-1914723, Nov. 18-22, 2019, 5 pages.

Co-pending CN Application No. 202080102100.8 Office Action mailed on Sep. 15, 2023, 13 pages with unofficial translation.

Huawei, et al., "UE-group wake-up signal" 3GPP TSG RAN WG1 Meeting #95 R1-1812133, Spokane, USA, Nov. 12-16, 2018, 9 pages.

CNIPA, First Office Action for Chinese Application No. 202310289692.5, mailed on Sep. 25, 2023, 12 pages with unofficial translation.

CNIPA, Second Office Action for Chinese Application No. 202310289692.5, mailed on Jan. 19, 2024, 17 pages with unofficial English translation.

International Search Report and Written Opinion for PCT/CN2020/098905, dated Mar. 29, 2021, 9 pages.

ZTE, et al. "Configuration details for grouping WUS" 3GPP TSG-RAN2 meeting #108 R2-1915639, Reno, Nevada, USA, Nov. 18-22, 2019, 7 pages.

Qualcomm Inc. "Remaining issues of 6.2.1.1 UE group MWUS " 3GPP TSG-RAN WG1 #96 R1-1903286, Athens, Greece, Feb. 25-Mar. 1, 2019, 6 pages.

MediaTek Inc. "NR RRM UE power saving" 3GPP TSG RAN WG1 Meeting RAN1 #96, R1-1903354 Athens, Greece, Feb. 25-Mar. 1, 2019, 11 pages.

Co-pending CN Application No. 202080102100.8 Second Office Action mailed on Jan. 3, 2024, 7 pages with unofficial translation.

Co-pending U.S. Appl. No. 17/886,400, filed Aug. 11, 2002, Advisory Action mailed Nov. 15, 2024, 3 pages.

Co-pending U.S. Appl. No. 17/886,400, filed Aug. 11, 2002, Final Office Action mailed Oct. 22, 2024,15 pages.

Co-pending EP Patent Application No. 20 891 181.8, Communication Rule 71(3) mailed Oct. 22, 2024, 5 pages.

Co-pending U.S. Appl. No. 17/886,400, filed Aug. 11, 2002, mailed Sep. 27, 2024, 50 pages.

Co-pending U.S. Appl. No. 17/886,400, filed Aug. 11, 2002, Notice of Allowance mailed Mar. 26, 2025, 11 pages.

Co-pending Indonesian Patent Application No. P00202209861, dated Jan. 22, 2025, Substantive Examination Result with unofficial English translation 4, pages.

Co-pending European Application No. 24215314.6, EPO, Extended European Search Report for, mailed on Feb. 10, 2025, 10 pages.

* cited by examiner

POWER SAVING TECHNIQUES

CROSS-REFERENCE TO RELATED APPLICATION

This application is a continuation and claims priority to International Application No. PCT/CN2020/098905, filed on Jun. 29, 2020, the disclosure of which is hereby incorporated by reference herein in its entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed to reduce power consumption and to improve power savings for a communication device during wireless operations such as paging.

An example wireless communication method includes receiving, by a communication node, a signal-based wake up signal (WUS) that includes L symbols in time domain, where the signal-based WUS is associated with the communication node or with a group to which the communication node belongs, and where the signal-based WUS includes an indication information that indicates whether the communication node is triggered to monitor a paging occasion; and determining whether to perform a paging related operation based on the indication information.

Another example wireless communication method, comprises receiving, by a communication node, a channel-based wake-up signal (WUS) that is included in a channel, where the channel-based WUS is associated with the communication node or with a group to which the communication node belongs, and where the channel-based WUS includes an indication information that indicates whether the communication node is triggered to monitor a paging occasion; and determining whether to perform a paging related operation based on the indication information.

In yet another example wireless communication method, the method includes generating, by a network node, a signal using an initialization seed that is based on a synchronization signal block (SSB); and mapping the signal to one or more physical resources first in time domain and then in frequency domain, wherein the one or more physical resources excludes a resource used by a control resource set (CORESET).

In yet another example wireless communication method, the method includes configuring physical resources for a communication node or a group of one or more communication nodes, where the physical resources include a control resource set (CORESET), a search space, and a control channel element (CCE); generating a channel-based wake-up signal (WUS) by mapping modulated symbols and a demodulation reference signal (DMRS) onto the physical resources, where the modulated symbols include an indication information that indicates whether the communication node or the one or more communication nodes are triggered to monitor a paging occasion; and transmitting the channel-based WUS.

In yet another exemplary aspect, the above-described methods and the methods described in this patent document are embodied in the form of processor-executable code and stored in a non-transitory computer-readable storage medium. The code included in the computer readable storage medium when executed by a processor, causes the processor to implement the above-described methods and methods described in this patent document.

In yet another exemplary embodiment, a device or an apparatus is disclosed, where the device or apparatus is configured or operable to perform the above-described methods and the methods described in this patent document.

The above and other aspects and their implementations are described in greater detail in the drawings, the descriptions, and the claims.

DETAILED DESCRIPTION

Figure 1:
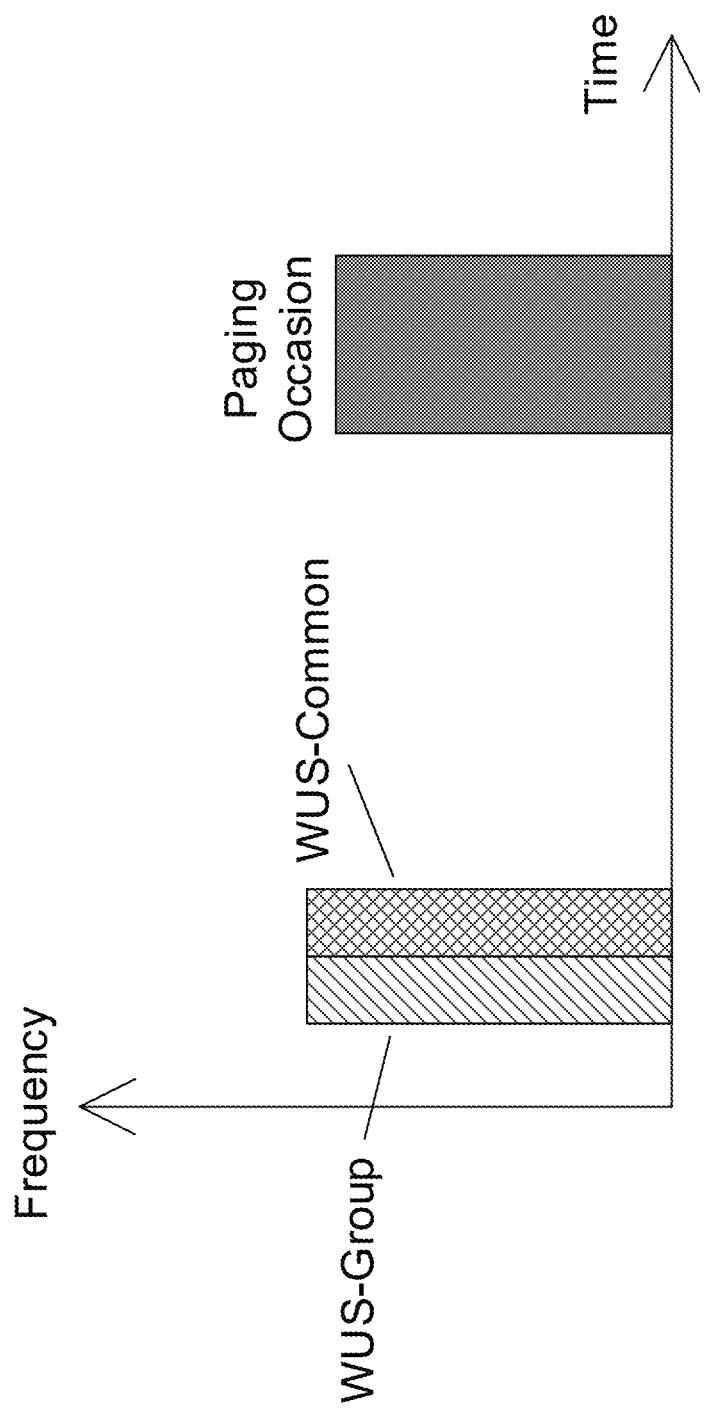
FIG. 1 shows an example scenario where a user equipment (UE) receives a UE group wake up signal (WUS) at a resource that is immediately adjacent to the resource for the common WUS.

During one Paging Occasion (PO) of a paging cycle, a User Equipment (UE) which is under Radio Resources Control (RRC) Idle state (RRC_Idle) or RRC inactive state (RRC_Inactive) may have no Physical Downlink Control Channel (PDCCH) which schedules paging message. This UE might may also have no Physical Downlink Shared Channel (PDSCH) that carries paging message. However, this UE is still expected to receive and decode PDCCH/PDSCH during a paging cycle. Such a paging operation can consume some unnecessary power. In some cases, during one PO, the UE might have PDCCH because the network might schedule multiple paging messages together. However, the content of corresponding PDSCH may not include an actual paging message for this UE. Such a paging operation can also consume some unnecessary power.

In the 5th Generation mobile communication system (5G), the Discontinuous Reception (DRX) is technology that does not require UE contiguously receive signal/channel from base station. It can intermittently receive signal/channel for a period of time while stop doing that in another period of time. The period of a DRX is a DRX cycle. One DRX cycle includes ON duration of a DRX cycle (DRX-ON) and OFF duration of a DRX cycle (DRX-OFF). For a UE under RRC_Connected state, this UE will apply DRX for connected mode (C-DRX). For a UE under RRC_Idle/RRC_Inactive state, this UE will apply DRX for idle mode (I-DRX).

For a UE under RRC_Idle/RRC_Inactive state, this UE should detect possible paging during PO of each paging cycle during DRX-ON duration. In some scenarios, there will be no PDCCH that schedules paging message. In some other scenarios, there will be PDCCH but there is no PDSCH that carries paging message. In still some other scenarios, there will be both PDCCH and PDSCH but the PDSCH does not include the content of the paging message for this UE. To overcome at least these technical problems, this patent document describes techniques to reduce UE's power consumption. Unlike current technology, the power savings techniques described in this patent document can more precisely inform the UE as to whether there is paging message for the UE. As a result, the UE can reduce unnecessary paging, thereby saving power consumption.

This patent document provides an introduction to the detailed examples in Section I. In Section II, a detailed example 1 describes, among other techniques, methods for determining a location (e.g., time domain resource, frequency domain resource) of the radio resource for the wake up signal (WUS). Section III, IV, V, and VII includes several detailed examples that describe, among other techniques, a design of the WUS to be included as data. Section VI describes, among other techniques, a detailed example of how to design the WUS to be included in a channel. The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

I. Introduction to Detailed Examples

When a base station transmits paging or paging message, it can combine multiple paging messages of UEs together for one transmission. The combination of multiple paging messages of UEs contents 5G S-Temporary Mobile Subscription Identifier (5G_S_TMSI, one for each paging message. When a UE is connected to 5G core network, this UE will be assigned a 5G_S_TMSI). The combination of multiple paging messages is carried by PDSCH. Before the transmission of PDSCH, a PDCCH that schedules PDSCH can be transmitted.

When a UE receives a paging message, the UE will derive paging frame (PF) and PO according to user identity (UE ID), where the UE ID is modulo of 5G_S_TMSI by 1024. That is, in binary, the UE ID is the last ten bits of 5G_S_TMSI. Because there are 48 bits in 5G_S_TMSI, some UEs (e.g., 2^38 UEs) may have the same UE ID. That is, one paging for a first UE may be received by a second UE by successful decoding of PDSCH that carries the paging message. However, the second UE drops the paging message because the 5G_S_TMSI does not match the UE ID of the second UE. This example scenario can generate a false alarm and cause unnecessary power consumption.

If the base station can transmit a signal, such as Wake up Signal (WUS), that indicates which UE should monitor the incoming paging occasion (PO) before the transmission of the PDCCH that schedules the paging message, then the UE can save some power consumption. Before the transmission of paging message, the base station can transmit reference signal to UE for measurement, synchronization and Automatic Gain Control (AGC). This reference signal can be implemented by Wake Up Signal (WUS). For example, the UE can utilize WUS for measuring Reference Signal Receiving Power (RSRP) and determining downlink timing synchronization for good working states or proper wireless communication operations with the base station.

II. Detailed Example 1

In Detailed Example 1, the resources allocated to the WUS can include time domain resource(s) and/or frequency domain resource(s). The Detailed Example 1 also describes length of the WUS.

When a UE is in radio resource control idle (RRC_Idle) or RRC_Inactive state, it needs monitor possible paging occasion in each paging cycle. For this case, there may be no physical downlink control channel (PDCCH) that schedules the paging or, there is PDCCH that schedules the paging but there is no physical downlink shared channel (PDSCH) that carries the paging message or, there are PDCCH and PDSCH but the paging message is not for this UE because of inconsistent 5G-S-TMSI. This operation related to monitoring possible PO will consume some unnecessary power. For this case, the base station can transmit an indication information before UE monitoring this PO. This indication information can indicate when a UE needs to monitor an incoming PO. This indication information can be carried on Wake up Signal (WUS). This WUS can be present in form of a signal or a sequence or a channel.

After receiving the paging indication (e.g., WUS), a UE can determine whether it should monitor the incoming PO for the next paging cycle. This will reduce the reception of unnecessary paging. Hence it will save UE's power consumption.

During a specific time, e.g., an Orthogonal Frequency Division Multiplexing (OFDM) symbol or, a slot or, a burst or, a monitoring occasion, a UE can receive one or more WUS. For example, a UE receives two WUS in total, one for the common WUS (e.g., all UE should receive this kind of WUS, or one or more groups of UE should receive this kind of WUS) and the other for UE group WUS (e.g., UE belong to this group should receive this kind of WUS). Alternatively, a UE receives three WUS in total, one for the common WUS, the second WUS is for UE group WUS and the third WUS is for another UE group WUS (e.g., a UE belongs to UE group 1 and UE group 2).

Alternatively, a WUS occupies one or more OFDM symbols in time domain. Alternatively, a WUS can repeat several times. For example, a WUS can be transmitted N times in repeat. For example, a WUS can repeat N times where N=N_Sym_per_Slot−N_Duration_CORESET, where the N_Sym_per_Slot is the number of symbols within a slot, and where N_Duration_CORESET is the number of symbols of a Control resource set (CORESET). N_Sym_per_Slot can be 14 for normal Cyclic Prefix (CP) and 12 for extended CP, and N_Duration_CORESET can be 0, 1, 2, 3. Hence, in some cases, the N can be N=11, if e.g., N_Sym_per_Slot is 14 and N_Duration_CORESET is 3. Alternatively, a WUS is transmitted in different beam for different time slot. Alternatively, a WUS is transmitted in different beam for different OFDM symbol.

Alternatively, the length of a WUS can be Q complex numbers, e.g., 0<Q<4000. Alternatively, the length of a WUS can be great than or equal to that of secondary synchronization signal (SSS). Alternatively, the length of a WUS can be a prime number that is great than or equal to that of SSS. Alternatively, the length of a WUS can be a prime number that is great than or equal to double length of SSS.

Alternatively, when a WUS repeats in time domain, it can be transmitted as $W*exp(j*2*\pi*(s \bmod A)/A)$, where W is a base WUS sequence, expo is an exponential operator, j is the unit of imaginary number, s is the OFDM symbol index, and A is a constant number. For example, if A=4 and there are 14 symbols in a slot, then the base WUS sequence will be transmitted in symbol s=0, 4, 8, 12 and, the sequence $W*exp(j*\pi/2)$ will be transmitted in symbol s=1, 5, 9, 13 and, the sequence−1*W will be transmitted in symbol s=2, 6, 10 and, the sequence $W*exp(j*3*\pi/2)$ will be transmitted in symbol s=3, 7, 11.

Alternatively, a WUS occupies L contiguous OFDM symbols in time domain.

Alternatively, L is two and the contents of these two symbols are the same (e.g., the content of the second symbol is the repetition of the first symbol). Alternatively, the content of the second symbol is the conjugate complex of the first symbol. Alternatively, the content of the second symbol is the cyclic shift of the first symbol. For example, $a2(k)=a1((k+N) \bmod M)$. Wherein the a2 is the content of the second symbol, a1 is the content of the first symbol, the k is the resource element (RE) number, $0 \le k \le M-1$, M is the length of WUS in the first symbol, N is the amount of shift. Alternatively, the N can be N=PCI mod P, where PCI is the physical cell ID, e.g., PCI=0~1007, P is a positive integer, e.g., P=3 or 6, the mod( ) is a modular operator.

Alternatively, a WUS occupies L=3 contiguous OFDM symbols in time domain. Alternatively, the contents of these three symbols are the same (e.g., the content of the second and third symbol is the repetition of the first symbol). Alternatively, the content of the second symbol is the conjugate complex of the first symbol while the third symbol is negative number of the first symbol.

Alternatively, a WUS occupies L=4 contiguous OFDM symbols in time domain. Alternatively, the contents of these three symbols are the same (e.g., the content of the second and third and fourth symbol is the repetition of the first symbol). Alternatively, the content of the second symbol is the conjugate complex of the first symbol and, the third symbol is negative number of the first symbol and, the fourth symbol is the negative number of conjugate complex of the first symbol. Alternatively, the content of the second symbol is the content of the first symbol multiplied by j and the content of the fourth symbol is the content of the first symbol multiplied by −j.

Alternatively, a WUS occupies L=N_Sym_per_Slot−N_Duration_CORESET contiguous OFDM symbols in time domain. Wherein the N_Sym_per_Slot is the number of symbols within a slot, N_Sym_per_Slot can be 14 for normal CP, N_Duration_CORESET is the number of symbols of a CORESET, N_Duration_CORESET can be 0, 1, 2, 3. If there is N_Duration_CORESET=3, then L=14−3=11. Alternatively, a WUS occupies L=N_Sym_per_Slot−N_SSB symbols in time domain. Wherein the N_SSB is the number of symbols of synchronization signal and/or physical broadcast channel (PBCH) block (SSB), where N_SSB=4 and L=14−3=10. In this patent document, a SSB can include primary synchronization signal (PSS), secondary synchronization signal (SSS), and PBCH. Alternatively, a WUS occupies L=N_SSB=4 symbols in time domain. Alternatively, the WUS occupies the identical symbols to that of SSB but with different frequency resources.

Alternatively, in a slot without CORESET, N_Duration_CORESET is zero or three. In a slot with CORESET, N_Duration_CORESET is one or two or three. Alternatively, In a slot with CORESET, N Duration CORESET is three.

Alternatively, a WUS occupies L=N_Sym_per_Slot−N_SSB symbols contiguously or discontinuously in time domain. Alternatively, a WUS occupies L=N_Sym_per_Slot−N_SSB symbols contiguously or discontinuously in a time slot. For example, if the SSB started a symbol from ID_Symbol (ID_Symbol=0, 1, 2, 3, . . . , 10) in a slot, then the WUS will occupy those symbols without SSB occupancy. For example, if the SSB started from symbol ID_Symbol=1, then the symbol 0, symbol ID_Symbol+4=1+4=5 to symbol 13 will be used for WUS. Alternatively, WUS starts from the lowest symbol index that is not occupied by SSB. Alternatively, WUS starts from the lowest frequency index. Alternatively, WUS starts from the allocated lowest frequency index. Alternatively, WUS starts from the allocated lowest sub-carrier index. When a WUS is mapped to resources, the WUS will be mapped to resource element (RE) first in frequency then in time domain. When a WUS is mapped to resources, the WUS will be mapped to resource element (RE) first in time domain then in frequency domain.

Alternatively, a WUS occupies L symbols contiguously or discontinuously from the next symbol of the end symbol of SSB to the last symbol of a time slot. Alternatively, a WUS occupies L symbols contiguously or discontinuously from the next symbol of the end symbol of SSB to the last symbol of the current time slot or next time slot. Alternatively, when the number of available symbols in the current time slot is less than a value M_Available (e.g., M_Available=11), a WUS occupies L symbols contiguously or discontinuously from the next symbol of the end symbol of SSB to the last symbol of the next time slot.

Alternatively, a WUS occupies L symbols contiguously at a time slot next to the time slot of SSB. Alternatively, a WUS starts form a symbol index ID_Symbol (ID_Symbol=0, 1, 2, 3, . . . , 13). Alternatively, a WUS starts form a symbol index ID_Symbol=2. Alternatively, a WUS starts form a symbol index ID_Symbol=N_Duration_CORESET=3.

Alternatively, there is one or more resources in time domain for WUS. Alternatively, there is only one resource in time domain for WUS while FDM is applied for different WUS. Alternatively, the common WUS (WUS-Comm) is with the lowest frequency index. Alternatively, if there were a common WUS, then the common WUS is with the lowest frequency index. Alternatively, the common WUS is at the center of frequency. Alternatively, the common WUS is at the frequency center of a carrier (e.g., serving cell). Alternatively, the common WUS is at the frequency center of a bandwidth part (BWP) in a carrier.

Alternatively, there are two resources in time domain for WUS. The two WUS are time division multiplexed (TDM) in time domain. Alternatively, the common WUS is at the resource that is nearest to PO. Alternatively, if there were a common WUS, then the common WUS is at the resource that is nearest to PO. Alternatively, if there were a common WUS, then the UE group WUS is at the resource that is immediately adjacent to the resource for the common WUS as shown in FIG. 1.

Alternatively, the UE capability will indicate whether a UE supports WUS or not. Alternatively, the UE capability will indicate whether a UE supports UE group WUS or not. Alternatively, when a UE supports WUS, the UE capability will indicate whether a UE supports UE group WUS or not. Alternatively, the UE capability will indicate whether a UE supports cross-slot scheduling for paging or not.

Alternatively, a WUS occupies N_Freq (N_Freq=1, 2, 3, . . . , 274, 275) physical resource block (PRB) in frequency domain. Alternatively, the bandwidth of a WUS is N_Freq contiguous PRB. Alternatively, the frequency location (e.g., start PRB and length) is configured by higher layer.

Alternatively, a WUS occupies N_Freq=1 PRB in frequency domain. This WUS occupies N_SubCarrier=12 subcarriers in frequency domain. This WUS occupies L=N_Sym_per_Slot−N_Duration_CORESET=14−3=11 symbols (e.g., symbol index 3, 4, 5, . . . , 12, 13) in time domain. The length of WUS is N_Freq*N_SubCarrier*L=132. Alternatively, the length of WUS is the prime number that is not excess N_Freq*N_SubCarrier*L (e.g., 131 for this case). Alternatively, the length of WUS is the power of two that is not excess N_Freq*N_SubCarrier*L (e.g., $2^7$=128 for this case). Alternatively, the length of WUS is the minus one of the power of two that is not excess N_Freq*N_SubCarrier*L (e.g., $2^7$−1=127 for this case).

Alternatively, for extended CP, a WUS occupies L=N_Sym_per_Slot_ECP−N_Duration_CORESET_ECP symbols in time domain. Wherein N_Sym_per_Slot_ECP=12, N_Duration_CORESET_ECP=0, 1, 2, 3. Alternatively, when N_Duration_CORESET_ECP=1 and N_Freq=1, this WUS occupies L=11 symbols in time domain (e.g., symbol index 1, 2, 3, 4, 5, . . . , 10, 11) and the length of WUS is N_Freq*N_SubCarrier*L=132. Alternatively, when N_Duration_CORESET_ECP=1 and N_Freq=2, the length of WUS is N_Freq*N_SubCarrier*L=264. Alternatively, when N_Duration_CORESET_ECP=2 and N_Freq=1, the length of WUS is N_Freq*N_SubCarrier*L=120. Alternatively, when N_Duration_CORESET_ECP=2 and N_Freq=2, the length of WUS is N_Freq*N_SubCarrier*L=240. Alternatively, when N_Duration_CORESET_ECP=3 and N_Freq=1, the length of WUS is N_Freq*N_SubCarrier*L=108. Alternatively, when N_Duration_CORESET_ECP=3 and N_Freq=2, the length of WUS is N_Freq*N_SubCarrier*L=216. Alternatively, when N_Duration_CORESET_ECP=3 and N_Freq=3, the length of WUS is N_Freq*N_SubCarrier*L=324. Alternatively, when N_Duration_CORESET_ECP=3 and N_Freq=4, the length of WUS is N_Freq*N_SubCarrier*L=432.

Alternatively, the bandwidth of WUS is N_Freq=1 in frequency domain and L=N_Sym_per_Slot=14 symbols in time domain, then the length of WUS is N_Freq*N_SubCarrier*L=168. Alternatively, the bandwidth of WUS is N_Freq=1 in frequency domain and L=N_Sym_per_Slot−N_SSB=10 symbols in time domain, then the length of WUS is N_Freq*N_SubCarrier*L=120.

Alternatively, the bandwidth of WUS is N_Freq=2 in frequency domain but the WUS repeats in each PRB and, L=N_Sym_per_Slot−N_Duration_CORESET=14−3=11 symbols in time domain, then the length of WUS is (N_Freq/2)*N_SubCarrier*L=132. Alternatively, the content of the WUS on the second PRB is the conjugate complex of the content of the WUS on the first PRB. Alternatively, the content of the WUS on the second PRB is the exp(j*θ) times of the content of the WUS on the first PRB, e.g., θ=π/2.

Alternatively, the frequency location of a WUS is within the frequency range of SSB. Alternatively, the PRB location of a WUS is within the PRB range of SSB. Alternatively, the frequency location of a WUS is configured by higher layer.

Alternatively, a WUS repeats in N_Slot time slots configured by higher layer. Alternatively, a WUS repeats N_Repeat times in time domain, e.g., N_Repeat=1, 2, 3, . . . , 199, 200. Alternatively, N_Repeat is configured by higher layer. Alternatively, a WUS repeats in N_Repeat*N_SSB times. Wherein the N_SSB is the transmission times of SSB, e.g., N_SSB=1, 2, 3, . . . , 99, 100. Alternatively, the N_SSB is configured by higher layer.

Alternatively, the WUS uses the identical antenna port to that of the corresponding SSB. Alternatively, the WUS that is associated with a PO uses the identical antenna port to that of the SSB that the PO is corresponding to. Alternatively, the WUS uses single antenna port.

Alternatively, a WUS in each transmission is QCL with the corresponding SSB. For example, if the WUS were transmitted actually T (e.g., T=3) times, then the first WUS is QCL with the first SSB and, the second WUS is QCL with the second SSB and, the third WUS is QCL with the third SSB. That is, the ith WUS is QCL with the ith SSB, where i=1, 2, . . . , T.

Alternatively, the UE can assume the number of WUS transmission is less than or equal to that of SSB. Alternatively, one symbol in time domain is combined with specific bandwidth. Alternatively, one symbol in time domain is combined with specific bandwidth such as that of SSB. Alternatively, one symbol in time domain is combined with specific bandwidth such as that of CORESET 0. Alternatively, one symbol in time domain is combined with specific bandwidth such as that of downlink initial BWP. Alternatively, when the WUS overlaps with the transmission of SSB, the WUS is not transmitted but this transmission (e.g., the transmission occasion for WUS) is counted as a transmission of the WUS. In this patent document, the term "counted as" may be the same as "determined as." Thus, in the previous sentence, the base station can determine that a transmission of a WUS is not performed upon actually transmitting the SSB.

Alternatively, when the WUS overlaps with the transmission on any physical resource block (PRB) of SSB, the WUS is not transmitted but this transmission (e.g., transmission occasion for WUS) is counted as a transmission of the WUS. Alternatively, if the WUS overlaps with a SSB, then the UE and base station count it as a transmission of the WUS while this transmission (e.g., transmission occasion for WUS) does not occur. Alternatively, the UE and base station count the number of WUS transmission in order to determine something like initialization seed of WUS. Alternatively, when the WUS overlaps in frequency domain/time domain with the transmission of SSB, the WUS is not transmitted but this transmission (e.g., transmission occasion for WUS) is counted as a transmission of the WUS. Alternatively, when the WUS overlaps with the transmission of SSB, the WUS is not transmitted and this transmission (e.g., transmission occasion for WUS) is not counted as a transmission of the WUS. Alternatively, when the WUS overlaps with the transmission of SSB, the WUS is not transmitted on resources for SSB but on resources not for SSB, at the same time, this transmission (e.g., WUS transmission) is counted as a transmission of the WUS.

Alternatively, when the WUS overlaps with the transmission of PDSCH that carrying system information (SI), the WUS is not transmitted but this transmission (e.g., transmission occasion for WUS) is counted as a transmission of the WUS. Alternatively, when the WUS overlaps with the transmission on any PRB of PDSCH that carrying SI, the WUS is not transmitted but this transmission (e.g., transmission occasion for WUS) is counted as a transmission of the WUS. Alternatively, when the WUS overlaps with the transmission on any PRB of PDSCH that is associated with system information Radio Network Temporary Identity (SI-RNTI), the WUS is not transmitted but this transmission (e.g., transmission occasion for WUS) is counted as a transmission of the WUS. Alternatively, when the WUS overlaps on the physical resource block with the transmission of PDSCH that carrying system information, the WUS is not transmitted but this transmission (e.g., transmission occasion for WUS) is counted as a transmission of the WUS.

Alternatively, there is an indication information on WUS to indicate whether the WUS overlaps on the physical resource block with the transmission of PDSCH that carrying system information or not. Alternatively, there is an indication information on WUS to indicate whether the WUS overlaps on the physical resource block with the transmission of PDSCH that is associated with SI-RNTI or not. Alternatively, there is an indication information on WUS to indicate where the paging message is carried. Alternatively, there is an indication information on WUS to indicate on which carrier (i.e., serving cell) the paging message is carried. Alternatively, there is an indication information on WUS to indicate on which bandwidth part (BWP) the paging message is carried. Alternatively, there is an indication information on WUS to indicate on which BWP the WUS is transmitted. Alternatively, the BWP has a BWP ID, e.g., 0, 1, 2, 3, 4, 5, 6, 7. Alternatively, the WUS and the corresponding paging message are on the same carrier (i.e., serving cell). Alternatively, the WUS and the corresponding paging occasion (PO) are on the same carrier. Alternatively, the WUS and the corresponding PO can be on the different carrier. Alternatively, the WUS and the corresponding PO are on the same BWP. Alternatively, the WUS and the corresponding PO can be on the different BWP. Alternatively, a UE can assume that the WUS and the corresponding PO are on the same BWP.

Alternatively, when the WUS overlaps with the transmission of channel state information reference signal (CSI-RS), those overlapped resource elements (RE) on the WUS is punctured. Alternatively, when the WUS overlaps with the transmission of CSI-RS, those overlapped RE on the WUS is with zero power. Alternatively, when the WUS overlaps with the transmission of CSI-RS, those overlapped RE on the WUS is punctured but counted as the RE for WUS. Alternatively, when the WUS overlaps with the transmission of CSI-RS, those overlapped RE on the WUS is not available but counted as the RE for WUS. Alternatively, when the WUS overlaps with the transmission of CSI-RS, those overlapped RE on the WUS is punctured and not counted as the RE for WUS. Alternatively, when the WUS overlaps with the transmission of CSI-RS, the WUS performs rate matching around CSI-RS. Alternatively, when the WUS overlaps with the transmission of positioning reference signals (PRS), those overlapped RE on the WUS is punctured. Alternatively, when the WUS overlaps with the transmission of PRS, those overlapped RE on the WUS is punctured but counted as the RE for WUS.

Alternatively, the WUS is transmitted on a BWP with SSB configuration on this BWP. Alternatively, the WUS is transmitted on a BWP without SSB but the WUS is QCL with SSB on other BWP. Alternatively, the PRB number of WUS is within the range of the PRB number of SSB.

Alternatively, when the WUS overlaps with the transmission of CORESET 0, the WUS is not transmitted but this transmission (e.g., transmission occasion for WUS) is counted as a transmission of the WUS. Alternatively, when the WUS overlaps with the transmission of PDCCH on CORESET 0, the WUS is not transmitted but this transmission (e.g., transmission occasion for WUS) is counted as a transmission of the WUS. Alternatively, when the WUS overlaps with the transmission of CORESET 0, the WUS is not transmitted on resource for CORESET 0 but on resource not for CORESET 0, at the same time, this transmission (e.g., WUS transmission) is counted as a transmission of the WUS. Alternatively, when the WUS overlaps with the transmission of CORESET 0, the WUS is not transmitted on symbols for CORESET 0 but transmitted on symbols not for CORESET 0, at the same time, this transmission (e.g., WUS transmission) is counted as a transmission of the WUS.

Alternatively, the bandwidth of WUS is N_Freq=3 PRB in frequency domain but the WUS repeats in each PRB (e.g., the content on every PRB is identical). Alternatively, the content on the second PRB is the conjugate complex of the content on the first PRB. Alternatively, the content on the third PRB is the negative conjugate complex of the content on the first PRB. Alternatively, the content on the second PRB is the content on the first PRB multiplied by $\exp(j*\theta)$, e.g., $\theta=2\pi/3$. Alternatively, the content on the third PRB is the content on the first PRB multiplied by $\exp(-j*\theta)$, e.g., $\theta=2\pi/3$. Alternatively, the frequency location of WUS is within the range of the frequency location of PO. Alternatively, the frequency location of WUS is within the range of the frequency location of PDCCH that scheduling paging message. Alternatively, the frequency location of WUS is within the range of the frequency location of PDSCH that carrying paging message. Alternatively, the PRB location of WUS is within the range of the PRB location of PO. Alternatively, the PRB location of WUS is within the range of the PRB location of PDCCH that scheduling paging message. Alternatively, the PRB location of WUS is within the range of the PRB location of PDSCH that carrying paging message.

Alternatively, the bandwidth of WUS is N_Freq=3 PRB in frequency domain and the WUS occupies L=N_Sym_per_Slot−N_Duration_CORESET=14−3=11 symbols in time domain (e.g., symbol index 3, 4, 5, . . . , 12, 13), then the length of WUS (or WUS sequence) is Length_WUS=N_Freq*N_SubCarrier*L=396.

Alternatively, the bandwidth of WUS is N_Freq=4 PRB in frequency domain but the WUS repeats once in two PRB (e.g., the content of the second two PRB is identical to that of the first two PRB). The length of WUS is (N_Freq/2)*N_SubCarrier*L=264 for the case of L=N_Sym_per_Slot−N_Duration_CORESET=14−3=11 symbols.

Alternatively, when the WUS overlaps with the transmission of cell specific downlink control Information (DCI) (e.g., DCI Format 2_0), the WUS is not transmitted but this transmission (e.g., transmission occasion for WUS) is counted as a transmission of the WUS. Alternatively, when the WUS overlaps with the transmission of system information broadcast (e.g., SIB1, carried on PDSCH), the WUS is not transmitted but this transmission (e.g., transmission occasion for WUS) is counted as a transmission of the WUS. Alternatively, when the WUS overlaps with the transmission of cell specific DCI or system information broadcast, the WUS is not transmitted but the overlapped resources are counted as the resources for WUS.

Alternatively, the bandwidth of WUS is N_Freq=4 PRB in frequency domain. The length of WUS is N_Freq*N_SubCarrier*L=528 for the case of L=N_Sym_per_Slot−N_Duration_CORESET=14−3=11 symbols. Alternatively, the bandwidth of WUS is N_Freq=5 PRB in frequency domain. The length of WUS is N_Freq*N_SubCarrier*L=660 for the case of L=N_Sym_per_Slot−N_Duration_CORESET=14−3=11 symbols. Alternatively, the bandwidth of WUS is N_Freq=6 PRB in frequency domain. The length of WUS is N_Freq*N_SubCarrier*L=792 for the case of L=N_Sym_per_Slot−N_Duration_CORESET=14−3=11 symbols.

Alternatively, the bandwidth of WUS is N_Freq=6 PRB in frequency domain but the WUS repeats once in N_Freq/2=3 PRB (e.g., the content of the second N_Freq/2 PRB is identical to that of the first N_Freq/2 PRB). The length of WUS is (N_Freq/2)*N_SubCarrier*L=396 for the case of L=N_Sym_per_Slot−N_Duration_CORESET=14−3=11 symbols. Alternatively, the content of the second half PRB is the conjugate complex of the content of the first half PRB.

Alternatively, the bandwidth of WUS is N_Freq=7 PRB in frequency domain. The length of WUS is N_Freq*N_SubCarrier*L=924 for the case of L=N_Sym_per_Slot−N_Duration_CORESET=14−3=11 symbols. Alternatively, the bandwidth of WUS is N_Freq=8 PRB in frequency domain. The length of WUS is N_Freq*N_SubCarrier*L=1056 for the case of L=N_Sym_per_Slot−N_Duration_CORESET=14−3=11 symbols.

Alternatively, the bandwidth of WUS is N_Freq=8 PRB in frequency domain but the WUS repeats once in N_Freq/2=4 PRB (e.g., the content of the second N_Freq/2 PRB is identical to that of the first N_Freq/2 PRB). The length of WUS is (N_Freq/2)*N_SubCarrier*L=528 for the case of L=N_Sym_per_Slot−N_Duration_CORESET=14−3=11 symbols.

Alternatively, the bandwidth of WUS is N_Freq=12 PRB in frequency domain. The length of WUS is N_Freq*N_SubCarrier*L=144 for the case of L=1 symbols. Alternatively, the WUS with a length 144 repeats in multiple time slot.

Alternatively, the bandwidth of WUS is N_Freq=16 PRB in frequency domain. The length of WUS is N_Freq*N_SubCarrier*L=192 for the case of L=1 symbols. Alternatively, the bandwidth of WUS is N_Freq=20 PRB in frequency domain. The length of WUS is N_Freq*N_SubCarrier*L=240 for the case of L=1 symbols. Alternatively, the bandwidth of WUS is N_Freq=24 PRB in frequency domain. The length of WUS is N_Freq*N_SubCarrier*L=288 for the case of L=1 symbols. Alternatively, the bandwidth of WUS is N_Freq=25 PRB in frequency domain. The length of WUS is N_Freq*N_SubCarrier*L=300 for the case of L=1 symbols.

Alternatively, a WUS repeats N_Repeat transmission in time domain. Alternatively, every transmission of WUS is on a specific symbol in a slot. Alternatively, every transmission of WUS is on the last symbol in a slot. Alternatively, if the last symbol of the recent SSB is i_SSB, then the WUS will be transmitted on symbol (i_SSB+1) mod 14 in a slot. If the symbol i_SSB is the last symbol of a time slot, then the first symbol of a slot will be used for a WUS. Alternatively, If the symbol i_SSB is the last symbol of a time slot, then the symbol with an index j (j=3, 4, 5, 6, . . . , 9) of a slot will be used for a WUS.

Alternatively, the bandwidth of WUS is N_Freq=48 PRB in frequency domain but the WUS repeats once in N_Freq/2=24 PRB (e.g., the content of the second N_Freq/2 PRB is identical to that of the first N_Freq/2 PRB). The length of WUS is (N_Freq/2)*N_SubCarrier*L=288 for the case of L=1 symbols. Alternatively, the bandwidth of WUS is N_Freq=48 PRB in frequency domain and the length of WUS is N_Freq*N_SubCarrier*L=576 for the case of L=1 symbols.

Alternatively, the bandwidth of WUS is N_Freq=96 PRB in frequency domain but the WUS repeats once in N_Freq/4=24 PRB (e.g., the content of the fourth and third and second N_Freq/2 PRB is identical to that of the first N_Freq/2 PRB). The length of WUS is (N_Freq/2)*N_SubCarrier*L=288 for the case of L=1 symbols. Alternatively, the bandwidth of WUS is N_Freq=96 PRB in frequency domain but the WUS repeats once in N_Freq/2=48 PRB (e.g., the content of the second N_Freq/2 PRB is identical to that of the first N_Freq/2 PRB). The length of WUS is (N_Freq/2)*N_SubCarrier*L=576 for the case of L=1 symbols. Alternatively, the bandwidth of WUS is N_Freq=96 PRB in frequency domain and the length of WUS is N_Freq*N_SubCarrier*L=1152 for the case of L=1 symbols.

Alternatively, the frequency occupation of the WUS is aligned with resource block (RB) or resource block group (RBG). Alternatively, the bandwidth of the WUS is less than or equal to that of CORESET 0 (e.g., 24 PRB). Alternatively, the bandwidth of the WUS is less than or equal to that of SSB. Alternatively, the bandwidth of the signal is WUS than or equal to that of SSS. Alternatively, the bandwidth of the WUS is less than or equal to that of downlink (DL) initial BWP.

Alternatively, the bandwidth of the WUS is one or more RBG. This allocation will reduce resource fragment. Hence, the system performance will improved.

Alternatively, the bandwidth of the WUS is less than or equal to 5 MHz (e.g., 25 PRB for sub-carrier spacing (SCS)=15 kHz, 11 PRB for SCS=30 kHz, 5 PRB for SCS=60 kHz, 2 PRB for SCS=120 kHz. Alternatively, 24 PRB for SCS=15 kHz, 10 PRB for SCS=30 kHz).

Alternatively, the basic WUS sequence occupies 2 PRB. If the bandwidth of WUS is greater than 2 PRB, then the basic WUS sequence can repeat to the target bandwidth. For example, 12 repetitions for a bandwidth of 24 PRB.

Alternatively, when the time duration of WUS is one symbol, the WUS has the same bandwidth of CORESET 0. Alternatively, when the time duration of WUS is one symbol, the WUS has the same bandwidth of SSB. Alternatively, when the time duration of WUS is one symbol, the WUS has the same bandwidth of SSS. Alternatively, when the time duration of WUS is one symbol, the WUS has the same bandwidth of DL initial BWP.

Alternatively, when the time duration of WUS is two symbols, the WUS has the same bandwidth of CORESET 0. Alternatively, when the time duration of WUS is two symbols, the WUS has the same bandwidth of SSB. Alternatively, when the time duration of WUS is two symbols, the WUS has the same bandwidth of SSS. Alternatively, when the time duration of WUS is two symbols, the WUS has the same bandwidth of DL initial BWP.

Alternatively, when the time duration of WUS is L=2 symbols, the WUS has 1/L bandwidth of CORESET 0. Alternatively, when the time duration of WUS is L=2 symbols, the WUS has 1/L bandwidth of SSB. Alternatively, when the time duration of WUS is L=2 symbols, the WUS has 1/L bandwidth of SSS. Alternatively, when the time duration of WUS is L=2 symbols, the WUS has 1/L bandwidth of DL initial BWP.

Alternatively, the WUS lies in the center of a BWP or serving cell (e.g., carrier). Alternatively, when the bandwidth of WUS is less than a value (e.g., 24 PRB), then there is only one WUS. Alternatively, when the bandwidth of WUS is less than a value (e.g., 24 PRB), then there is only one location for WUS. Alternatively, Alternatively, the WUS lies in the center of the resources allocated to WUS.

Figure 2:
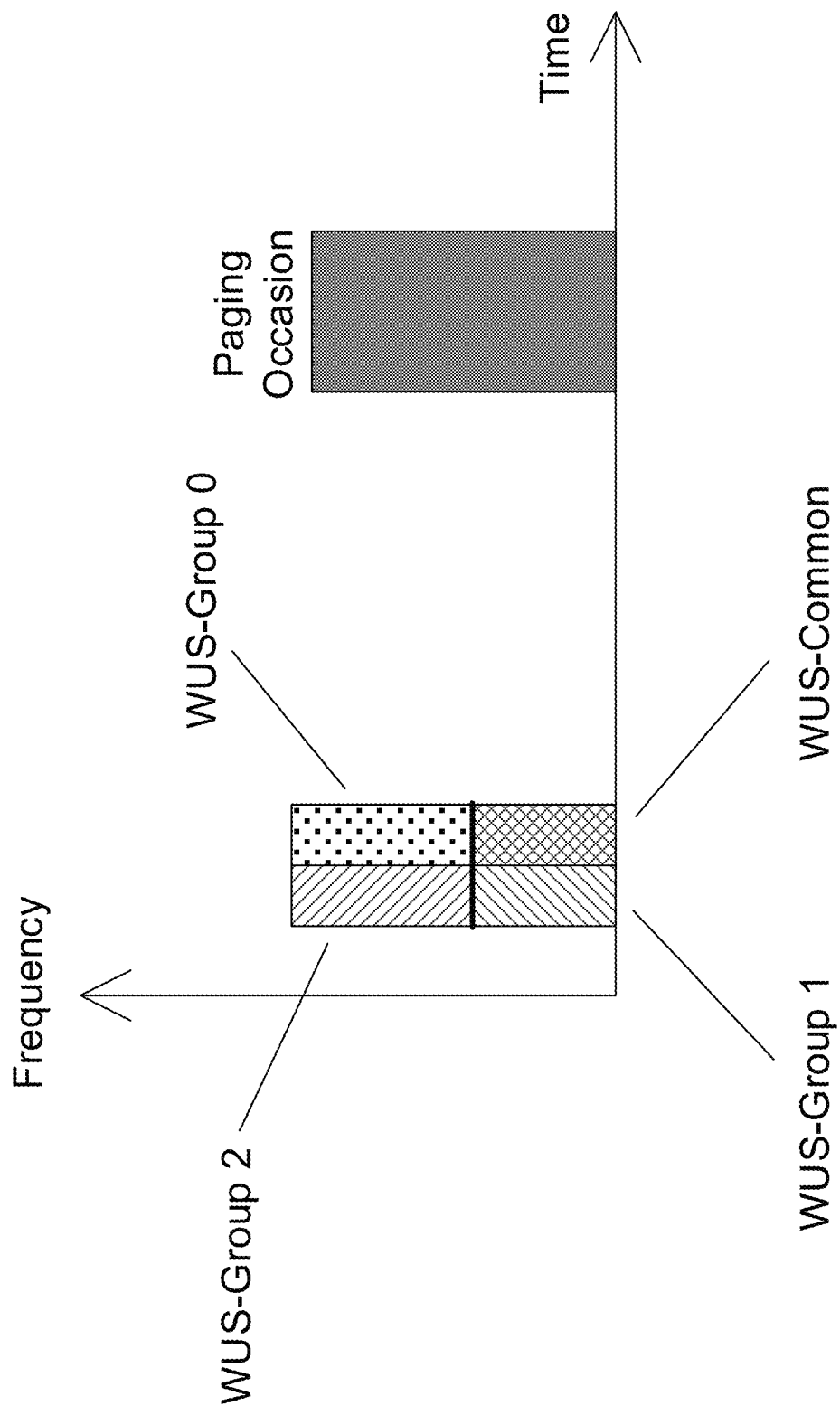
FIG. 2 shows an example scenario where four resources are associated with WUS associated with multiple groups of UEs.

Alternatively, the WUS has multiple resources in time domain and frequency domain. Alternatively, the WUS has four resources as shown in FIG. 2. Alternatively, if there exist common WUS (for all the UE or UE groups), then the common WUS locates at a resource that is nearest to PO and lowest in frequency. The UE group WUS 0 (WUS-Group 0) locates at a resource that is nearest to PO and adjacent to the common WUS in frequency. The other two group WUS are illustrated in FIG. 2.

Figure 3:
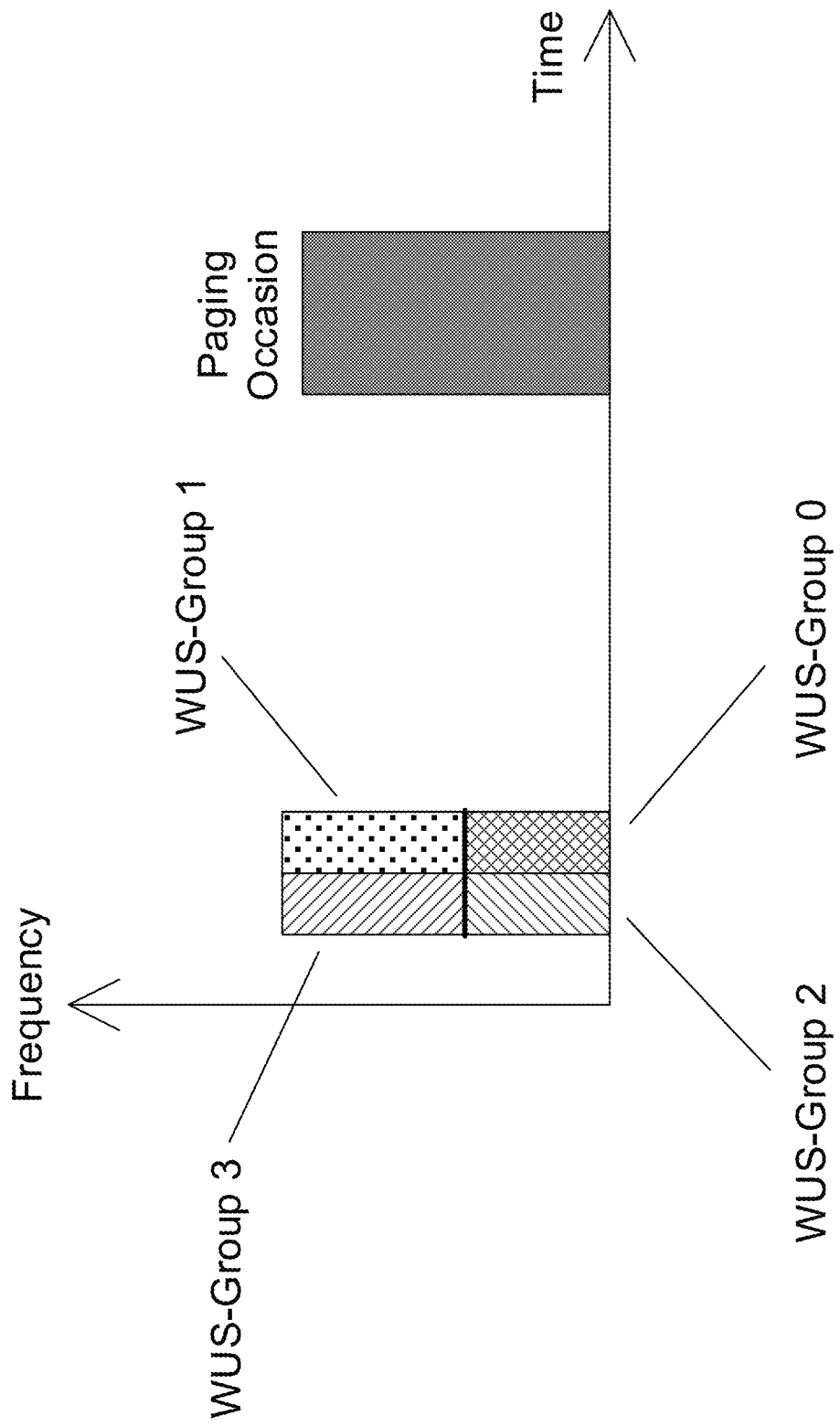
FIG. 3 shows that an index of a UE group WUS that is set first in time domain then in frequency domain.

Alternatively, the index UE group WUS is set according to first in time then in frequency as shown in FIG. 3. Alternatively, if there is no common WUS, then the UE group WUS 0 (WUS-Group 0) locates at a resource that is nearest to PO and lowest in frequency.

Alternatively, common WUS locates at the resource nearest to the center of frequency. Alternatively, common WUS locates at the resource nearest to the center of BWP. Alternatively, common WUS locates at the resource nearest to the center of serving cell (e.g., carrier). Alternatively, if there is no common WUS, then the UE group WUS 0 locates at the resource nearest to the center of frequency. Alternatively, if there is no common WUS, then the UE group WUS 0 locates at the resource nearest to the center of BWP. Alternatively, if there is no common WUS, then the UE group WUS 0 locates at the resource nearest to the center of serving cell.

Alternatively, the index of UE group WUS is changed in turn. For example, for one specific time, the index of UE group WUS is 0, 1, 2, 3 respectively, then for the next time, the index of UE group WUS is 3, 0, 1, 2, then for still the next time, the index of UE group WUS is 2, 3, 0, 1, then for still the next time, the index of UE group WUS is 1, 2, 3, 0, then for still the next time, the index of UE group WUS goes back to 0, 1, 2, 3. Alternatively, the index of UE group WUS is changed in turn with system frame number (SFN, SFN=0, 1, 2, . . . , 1023). For example, the index of UE group WUS is Index_WUS=(Index_WUS+(SFN mod $K$))mod $G$ or Index_WUS=(Index_WUS+SFN)mod $G$ wherein the Index_WUS is the index of UE group WUS, K is a constant such as K=4, G is number of UE group WUS.

Alternatively, the index of UE group WUS is changed in turn with hyper system frame number (HFN, HFN=0, 1, 2, . . . , 1023, a HFN has 1024 system frame). For example, the index of UE group WUS is Index_WUS=(Index_WUS+HFN)mod $G$ Alternatively, the index of the resource used by UE group WUS is changed in turn. For example, it is changed in every P radio frame (e.g., system frame, e.g., 10 ms), wherein the P can be the paging cycle with the unit of radio frame as the following.

Index_WUS=(Index_WUS+floor(SFN/$P$))mod $G$ wherein the floor( ) returns the integer that is not greater than the operand.

Alternatively, there are 8 WUS resources with ID=0, 1, 2, . . . , 7. Alternatively, these 8 resources are Frequency Division Multiplexing (FDM). The WUS resource index 0 is with the lowest frequency. Alternatively, Four of these 8 resources are Time Division Multiplexing (TDM) with the other four resource of these 8 resources. The WUS resource index 0 is with the lowest frequency and nearest to the PO. If there were a common WUS, then the common WUS locates at WUS resource index 0. If there were not a common WUS, then the UE group WUS with index 0 locates at WUS resource index 0.

Alternatively, there are 16 WUS resources with ID=0, 1, 2, . . . , 15. Alternatively, these 16 resources are FDM. The WUS resource index 0 is with the lowest frequency. Alternatively, Eight of these 16 resources are TDM with the other eight resource of these 16 resources. The WUS resource index 0 is with the lowest frequency and nearest to the PO. If there were a common WUS, then the common WUS locates at WUS resource index 0. If there were not a common WUS, then the UE group WUS with index 0 locates at WUS resource index 0.

III. Detailed Example 2

In Detailed Example 2, the sequence of the WUS is described. In some embodiments, the WUS can be associated with machine time communication (MTC).

When a UE is in RRC_Idle/RRC_Inactive state, it needs monitor possible paging occasion in each paging cycle. For this case, there may be no PDCCH that schedules the paging or, there is PDCCH that schedules the paging but there is no PDSCH that carries the paging message or, there are PDCCH and PDSCH but the paging message is not for this UE because of inconsistent 5G-S-TMSI. This monitoring possible PO related operation can consume some unnecessary power. For this case, the base station can transmit an indication information before UE monitoring this PO. This indication information can indicate when a UE needs to monitor an incoming PO. This indication information can be carried on Wake up Signal (WUS). This WUS can be present in form of a signal or a sequence or a channel.

After receiving the paging indication (e.g., WUS), a UE can determine whether it should monitor the incoming PO for the next paging cycle. This can reduce the reception of unnecessary paging. Hence it can save UE's power consumption.

A WUS can repeat multiple times. For example, it can be transmitted M_Repeat times in M_Repeat slots (or M_Repeat time slots) where the time slot index is x=0, 1, 2 . . . , M_Repeat−1. Alternatively, the same base sequence WUS (m) is used for each transmission as the following. Different scramble sequence or cover sequence θ(m') is used for each transmission as the following.

$$WUS(m) = e^{-j\frac{\pi un(n+1)}{L\_Seq\_Prim}} e^{j\frac{2\pi gm}{L\_Sequence}}$$

where w(m)=θ(m')WUS(m); m=0, 1, . . . , L_Sequence−1; m'=m+L_Sequence*x; and n=m mod L_Sequence $$\theta(m') = \begin{cases} 1 & \text{if } c(2m') = 0 \text{ and } c(2m'+1) = 0 \\ -1 & \text{if } c(2m') = 0 \text{ and } c(2m'+1) = 1 \\ j & \text{if } c(2m') = 1 \text{ and } c(2m'+1) = 0 \\ -1 & \text{if } c(2m') = 1 \text{ and } c(2m'+1) = 1 \end{cases}$$

$$\theta(m') = \begin{cases} 1 & \text{if } c(2m') = 0 \text{ and } c(2m'+1) = 0 \\ -1 & \text{if } c(2m') = 0 \text{ and } c(2m'+1) = 1 \\ j & \text{if } c(2m') = 1 \text{ and } c(2m'+1) = 0 \\ -j & \text{if } c(2m') = 1 \text{ and } c(2m'+1) = 1 \end{cases}$$

and where u=($N_{ID}^{cell}$ mod Root_Modul)+Root_Offset, and where the L_Sequence is the length of WUS sequence (as shown in example Table 1 below). L_Seq_Prim is the largest prime number that is not greater than L_Sequence (as shown in example Table 1 below). The g is the index of WUS group. Alternatively, different parameters are determined according to different number of WUS group. For example, for a common WUS, there is g=126 or g=238. If a UE is not configured with a grouping WUS, then g=0. If a UE is configured with a grouping WUS, then g=14($N_{group}^{WUS}$+1) or g=Q*($N_{group}^{WUS}$+1), where Q is a constant such as Q=17, $N_{group}^{WUS}$ is the index of UE group WUS, where $0 \leq N_{group}^{WUS} \leq 7$ for eight UE group WUS, $0 \leq N_{group}^{WUS} \leq 15$ for 16 UE group WUS. The c(n) is a pseudo-random sequence. u is the root index of Zadoff-Chu (ZC) sequence. Alternatively, u is an integer such as u=29. Alternatively, u is configured by higher layer. Alternatively, u is determined according to UE group ID ID_UE_Group such as u=7*ID_UE_Group. Alternatively, u is determined according to the index of WUS resource ID_WUS_Resource such as u=34+ID_WUS_Resource. Alternatively, the index of WUS resource and the UE group ID are mapped in one by one. Alternatively, the index of WUS resource is determined according to the UE group ID. The $N_{ID}^{cell}$ is physical layer cell identity (PCI) with a range of 0~1007. Root_Modul is used to compute root index such as Root_Modul=Sym_Slot*N_GroupWUS. Wherein the Sym_Slot=14 is number of symbols within a slot. N_GroupWUS is the total number of UE group WUS. For example, N_GroupWUS=8 or N_GroupWUS=16. Alternatively, Root_Modul=126 or Root_Modul=238. Alternatively, the Root_Offset can be Root_Offset=3 or Root_Offset=7. Alternatively, Root_Offset=7 when N_GroupWUS=16.

TABLE 1

| L_Sequence | L_Seq_Prim |
|---|---|
| 120 | 113 |
| 132 | 131 |
| 144 | 139 |
| 168 | 167 |
| 192 | 191 |
| 240 | 239 |
| 264 | 263 |
| 288 | 283 |
| 300 | 293 |
| 336 | 331 |
| 396 | 389 |
| 432 | 431 |
| 504 | 503 |
| 528 | 523 |
| 576 | 571 |
| 660 | 659 |
| 672 | 661 |
| 792 | 787 |

TABLE 1-continued

| L_Sequence | L_Seq_Prim |
|---|---|
| 924 | 919 |
| 1056 | 1051 |
| 1152 | 1151 |
| 1320 | 1319 |
| 1584 | 1583 |

The pseudo-random sequence c(i), i=0, 1, . . . , 2·L_Sequence·M_Repeat−1 is initialized with the following initialization seed.

$$c_{init} = (N_{ID}^{cell}+1)((10n_{f\_start\_PO}+n_{s\_start\_PO}) \bmod 2048 + 1)2^9 + N_{ID}^{cell} + N_{ID}^{resource} \cdot 2^{29} + \text{ID\_SSB}$$

or $$c_{init} = (N_{ID}^{cell}+1)((10n_{f\_start\_PO}+n_{s\_start\_PO}) \bmod 2048 + 1)2^9 + N_{ID}^{cell} + N_{ID}^{resource} \cdot 2^{29} + \text{ID\_SSB} + \text{RNTI}$$

wherein the $n_{f\_start\_PO}$ is the radio frame number of the first PO. The $n_{s\_start\_PO}$ is the slot number of the first PO that is associated with the WUS. $N_{group}^{WUS}$ is the index of UE group WUS. If a UE is not configured with a UE group WUS, then $N_{ID}^{resource}$=0. The ID_SSB is the SSB index. The ID_SSB can be 0~7 for frequency range (FR) 1 and 0~63 for FR2. The $N_{ID}^{cell}$ is physical layer cell identity. Alternatively, the $N_{ID}^{cell}$ can be a sub-set of physical layer cell identity such as $N_{ID}^{cell}$=Cell_ID mod 6 where the Cell_ID is physical layer cell identity. The Radio Network Temporary Identity (RNTI) can be the RNTI for paging (P-RNTI). Alternatively, when the UE is under RRC_Connected state, the RNTI above can be UE specific C-RNTI or configured scheduled RNTI (CS-RNTI) or modulation coding scheme C-RNTI (MCS-C-RNTI) or (PS-RNTI).

Alternatively, the UE grouping ID ID_UE_Group is mapped to the WUS resource index $N_{ID}^{resource}$ in one by one. For example, $N_{ID}^{resource}$=ID_UE_Group.

Alternatively, the WUS can be used for UE for automatic gain control (AGC) and radio resource management (RRM). For example, after measuring the receiving power of WUS reference signal (Reference Signal Receiving Power (RSRP) RSRP_WUS), a UE can replace RSRP of SSB with RSRP_WUS. This can reduce the requirement to receive SSB which will reduce power consumption. Alternatively, a UE can replace RSRP of SSB of its serving cell with RSRP_WUS of its serving cell. Alternatively, a UE can replace RSRP of SSB of its neighboring cell with RSRP_WUS of its corresponding neighboring cell.

Alternatively, the WUS can be used for time and frequency synchronization for UE. Alternatively, the UE can stop receiving SSB after WUS when it use a WUS for time and frequency synchronization. Alternatively, the UE can stop receiving SSB between WUS and PO when it use a WUS for time and frequency synchronization. Alternatively, if there were no indication that requires a UE go to monitor PO, the UE can stop receiving SSB between WUS and PO. Alternatively, if there were no indication that requires a UE group go to monitor PO, the UE in this group can stop receiving SSB between WUS and PO. The reduction of receiving SSB can save UE's power consumption.

Now some examples are illustrated here for the generation of WUS signal (or, WUS sequence) and, the mapping the WUS signal to physical resources.

It is assumed that the WUS occupies 2 PRB in frequency domain and L=N_Sym_per_Slot−N_Duration_CORESET=14−3=11 symbols (with symbols index 3, 4, 5, . . . , 12, 13) in time domain. Then the length of WUS is L_Sequence=2*12*11=264 (e.g., 264 complex number) and L_Seq_Prim=263. It is also assumed that $N_{ID}^{cell}$=55, Root_Offset=3, Root_Modul=126, then u=($N_{ID}^{cell}$ mod Root_Modul)+Root_Offset=55+3=58. It is also assumed that g=1 and x=0 (first transmission or without repetition), then m=0, 1, . . . , 263, m'=m, n=m. As the result of that, the WUS sequence is generated with the following equation.

$$WUS(m) = e^{-j\frac{\pi un(n+1)}{L\_Seq\_Prim}} e^{j\frac{2\pi gm}{L\_Sequence}}$$

Then, the base WUS sequence is [1.0+0.0i, 0.21−0.98i, −0.57+0.82i, −0.38−0.93i, 0.37−0.93i, −0.24−0.97i, −0.78+0.63i, 0.6−0.8i, 0.84+0.54i, 0.77+0.64i, 0.84−0.54i, −1.0+0.08i, 0.56−0.83i, 0.99−0.12i, 0.8−0.6i, −0.83−0.55i, 0.91+0.42i, −0.44+0.9i, −0.62+0.78i, 0.48+0.88i, 0.09−1.i, 0.65+0.76i, −0.24+0.97i, 0.19+0.98i, 0.91−0.42i, −0.88+0.47i, −0.36−0.93i, −0.06−1.i, −0.9−0.43i, 0.44+0.9i, −0.91−0.4i, −0.1−0.99i, −0.42−0.91i, −0.83+0.55i, 0.85−0.52i, 0.33+0.95i, −0.07+1.i, 0.79+0.62i, −0.13−0.99i, 0.67+0.74i, −0.4+0.92i, −0.17+0.99i, 0.99+0.12i, −0.97−0.24i, 0.53−0.85i, 0.87−0.48i, 0.18−0.98i, −0.87+0.5i, 0.51−0.86i, 0.98+0.21i, 1.0+0.07i, 0.11−0.99i, −0.33+0.94i, −0.73−0.68i, −0.22−0.97i, −0.85−0.53i, 0.05+1.i, −0.45−0.89i, 0.77−0.64i, 0.73−0.68i, −0.57−0.82i, 0.28+0.96i, −0.98−0.22i, −0.61−0.79i, −0.98−0.22i, 0.28+0.96i, −0.57−0.82i, 0.73−0.68i, 0.77−0.64i, −0.45−0.89i, 0.05+1.i, −0.85−0.53i, −0.23−0.97i, −0.73−0.68i, −0.33+0.94i, 0.11−0.99i, 1.0+0.06i, 0.98+0.21i, 0.51−0.86i, −0.87+0.5i, 0.18−0.98i, 0.87−0.49i, 0.53−0.85i, −0.97−0.24i, 0.99+0.11i, −0.16+0.99i, −0.39+0.92i, 0.68+0.74i, −0.13−0.99i, 0.79+0.61i, −0.07+1.i, 0.33+0.94i, 0.85−0.53i, −0.83+0.56i, −0.43−0.9i, −0.11−0.99i, −0.92−0.4i, 0.44+0.9i, −0.91−0.42i, −0.06−1.i, −0.36−0.93i, −0.88+0.48i, 0.91−0.43i, 0.19+0.98i, −0.23+0.97i, 0.66+0.75i, 0.08−1.i, 0.48+0.87i, −0.62+0.79i, −0.43+0.9i, 0.91+0.41i, −0.84−0.54i, 0.79−0.61i, 0.99−0.13i, 0.55−0.84i, −1.0+0.09i, 0.83−0.55i, 0.78+0.63i, 0.85+0.53i, 0.59−0.81i, −0.77+0.64i, −0.25−0.97i, 0.36−0.93i, −0.39−0.92i, −0.56+0.83i, 0.2−0.98i, 1.0−0.01i, 1.0−0.04i, 0.13−0.99i, −0.45+0.89i, −0.54−0.84i, 0.15−0.99i, −0.5−0.87i, −0.54+0.84i, 0.27−0.96i, 0.99+0.15i, 0.97+0.22i, 0.46−0.89i, −0.8+0.6i, −0.02−1.i, 0.71−0.7i, 0.22−0.98i, −0.99+0.17i, 0.93−0.36i, 0.38+0.93i, 0.22+0.98i, 0.99+0.13i, −0.79−0.62i, 0.98−0.18i, 0.75+0.66i, 0.97+0.25i, −0.04−1.i, 0.15+0.99i, −1.0+0.07i, −0.98−0.19i, −0.59+0.8i, 0.96−0.3i, −0.49+0.87i, −1.0+0.05i, −0.91+0.42i, 0.59+0.81i, −0.6−0.8i, 0.89−0.45i, 0.99−0.11i, 0.42−0.91i, −0.92+0.4i, 0.48−0.88i, 1.0+0.03i, 0.97−0.25i, −0.35−0.94i, 0.27+0.96i, −1.0+0.i, −0.9−0.44i, −0.89+0.46i, 0.94+0.34i, −0.98+0.22i, −0.56−0.83i, −0.71−0.71i, −0.7+0.71i, 0.82−0.58i, 0.25+0.97i, −0.3+0.96i, 0.51+0.86i, 0.37−0.93i, 0.08+1.i, −0.93+0.36i, −0.9+0.44i, 0.36+0.93i, −0.09−1.i, 0.93+0.36i, 0.53+0.85i, 0.96+0.27i, −0.28−0.96i, 0.61+0.79i, −0.67+0.75i, −0.67+0.75i, 0.61+0.79i, −0.28−0.96i, 0.96+0.27i, 0.53+0.85i, 0.93+0.36i, −0.1−1.i, 0.36+0.93i, −0.9+0.44i, −0.93+0.36i, 0.08+1.i, 0.37−0.93i, 0.51+0.86i, −0.29+0.96i, 0.25+0.97i, 0.82−0.58i, −0.7+0.71i, −0.71−0.7i, −0.56−0.83i, −0.98+0.22i, 0.94+0.33i, −0.88+0.47i, −0.9−0.43i, −1.0+0.01i, 0.27+0.96i, −0.35−0.94i, 0.97−0.26i, 1.0+0.03i, 0.48−0.88i, −0.92−0.4i, 0.41−0.91i, 0.99−0.12i, 0.89−0.46i, −0.6−0.8i, 0.59+0.8i, −0.91+0.42i, −1.0+0.06i, −0.49+0.87i, 0.95−0.3i, −0.59+0.81i, −0.98−0.18i, −1.0+0.08i, 0.16+0.99i, −0.05−1.i, 0.97+0.24i, 0.75+0.66i, 0.98−0.19i, −0.79−0.61i, 0.99+0.12i, 0.23+0.97i, 0.39+0.92i, 0.93−0.37i, −0.98+0.18i, 0.21−0.98i, 0.71−0.71i, −0.03−1.i, −0.79+0.61i, 0.46−0.89i, 0.98+0.21i, 0.99+0.14i, 0.25−0.97i, −0.53+0.85i, −0.51−0.86i, 0.14−0.99i, −0.55−0.84i, −0.44+0.9i, 0.11−0.99i, 1.0−0.05i, 1.0−0.02i].

After that, the scrambling sequence θ(m') is generated with the following equation.

$$\theta(m') = \begin{cases} 1 & \text{if } c(2m') = 0 \text{ and } c(2m'+1) = 0 \\ -1 & \text{if } c(2m') = 0 \text{ and } c(2m'+1) = 1 \\ j & \text{if } c(2m') = 1 \text{ and } c(2m'+1) = 0 \\ -j & \text{if } c(2m') = 1 \text{ and } c(2m'+1) = 1 \end{cases}$$

In addition, the scrambling sequence generator is initialized with the following initialization seed. After that, the scrambling sequence is generated with the initialization seed below.

$$c_{init} = (N_{ID}^{cell}+1)((10n_{f\_start\_PO}+n_{s\_start\_PO}) \bmod 2048 + 1)2^9 + N_{ID}^{cell} + N_{ID}^{resource} \cdot 2^{29} + \text{ID\_SSB}$$

For the convenience of computation, it is assumed that $n_{f\_start\_PO}$=10, $n_{s\_start\_PO}$=7, $N_{ID}^{resource}$=1, ID_SSB=1. Then $c_{init}$=539938872. The 31 binary representation of $c_{init}$ is 0100000001011101101000000111000.

In there, the pseudo-random sequence c(n) is computed by the following.

$$c(n)=(x_1(n+N_C)+x_2(n+N_C)) \bmod 2$$

$$x_1(n+31)(x_1(n+3)+x_1(n)) \bmod 2$$

$$x_2(n+31)=(x_2(n+3)+x_2(n+2)+x_2(n+1)+x_2(n)) \bmod 2$$

where $N_C$=1600 and the first m-sequence $x_1(n)$ shall be initialized with $x_1(0)$=1, $x_1(n)$=0, n=1, 2, . . . , 30 The initialization of the second m-sequence is the $c_{init}$ above.

Now, the scrambling sequence θ(m') is reached as [−j, 1, −j, −1, −1, −1, −j, −1, +j, 1, −1, −1, +j, −j, 1, 1, −1, −j, 1, +j, +j, −1, −1, −j, −j, −j, −j, −j, −1, −1, −1, +j, −j, +j, −1, −j, −1, 1, +j, 1, 1, +j, 1, J, −J, −J−, +j, +j, +j, +j, −1, 1, 1, 1, −1, −1, 1, +j, +j, +j, +j, 1, 1, 1, 1, 1, −1, j, −1, −1, +j, 1, +j, −j, +j, 1, −j, 1, +j, +j, −j, −1, 1, −1, 1, −j, −j, −1, 1, −1, 1, −j, −1, −j, +j, 1, +j, −j, −j, −1, −j, −j, +j, +j, −j, +j, 1, +j, −j, −j, +j, +j, 1, +j, +j, +j, 1, +j, −j, −j, −1, +j, −1, −j, −1, −1, +j, −1, −1, 1, −1, −j, −1, −j, −j, −j, 1, +j, −j, −1, +j, 1, 1, −1, −j, 1, −j, +j, 1, −j, +j, 1, 1, +j, +j, −j, +j, 1, −1, −j, 1, 1, −1, −j, +j, +j, −1, +j, −1, −1, 1, −1, −j, −1, −j, +j, 1, +j, 1, −1, −j, +j, −1, 1, −1, −1, 1, 1, −j, −1, 1, −j, −1, −1, 1, +j, 1, −j, +j, 1, 1, +j, −j, −1, −1, −1, −j, 1, 1, −j, −j, −j, −1, 1, +j, 1, 1, −j, −j, −1, −1, −1, −j, 1, −1, −1, −1, −j, −j, −j, 1, +j, +j, −j, 1, 1, −j, +j, −j, +j, 1, +j, −j, −1, −j, −1, 1, −1, 1, +j, +j, −j, −j].

Now, the final WUS sequence is reached with the following equation.

$$w(m)=\theta(m')WUS(m)$$

The final WUS sequence w(m) is [0.0−1.0i, 0.21−0.98i, 0.82+0.57i, 0.38+0.93i, −0.37+0.93i, 0.24+0.97i, 0.63+0.78i, −0.60+0.80i, −0.54−0.84i, 0.77+0.64i, −0.54−0.84i, 1.0−0.080i, −0.56+0.83i, 0.12+0.99i, −0.60+0.80i, −0.83−0.55i, 0.91+0.42i, 0.44−0.90i, 0.78+0.62i, 0.48+0.88i, 1.0+0.090i, −0.76+0.65i, 0.24−0.97i, −0.19−0.98i, −0.42−0.91i, 0.47+0.88i, −0.93+0.36i, −1.0+0.060i, −0.43+0.90i, −0.44−0.90i, 0.91+0.40i, 0.10+0.99i, 0.91−0.42i, 0.55+0.83i, 0.52+0.85i, −0.33−0.95i, 1.0+0.070i, −0.79−0.62i, −0.13−0.99i, −0.74−0.67i, −0.40+0.92i, −0.17+0.99i, −0.12+0.99i, −0.97−0.24i, −0.85−0.53i, −0.48−0.87i, −0.98−0.18i, 0.50+0.87i, 0.86+0.51i, −0.21+0.98i, −0.070+1.0i, 0.99+0.11i, 0.33−0.94i, −0.73−0.68i, −0.22−0.97i, −0.85−0.53i, −0.050−1.0i, 0.45+0.89i, 0.77−0.64i, 0.68+0.73i, 0.82−0.57i, −0.96+0.28i, 0.22−0.98i, −0.61−0.79i, −0.98−0.22i, 0.28+0.96i, −0.57−0.82i, 0.73−0.68i, −0.77+0.64i, −0.89+0.45i, −0.050−1.0i, 0.85+0.53i, 0.97−0.23i, −0.73−0.68i, −0.94−0.33i, −0.99−0.11i, −0.060+1.0i, 0.98+0.21i, −0.86−0.51i, −0.87+0.50i, 0.98+0.18i, 0.49+0.87i, −0.85−0.53i, 0.97+0.24i, 0.99+0.11i, 0.16−0.99i, −0.39+0.92i, 0.74−0.68i, −0.99+0.13i, −0.79−0.61i, −0.070+1.0i, −0.33−0.94i, 0.85−0.53i, 0.56+0.83i, 0.43+0.90i, −0.99−0.11i, 0.40−0.92i, 0.44+0.90i, 0.42−0.91i, −1.0+0.060i, −0.93+0.36i, 0.88−0.48i, −0.43−0.91i, 0.98−0.19i, −0.97−0.23i, −0.75+0.66i, −1.0−0.080i, −0.87+0.48i, −0.62+0.79i, −0.90−0.43i, 0.41−0.91i, −0.54+0.84i, 0.61+0.79i, 0.13+0.99i, 0.55−0.84i, −0.090−1.0i, 0.55+0.83i, −0.63+0.78i, 0.85+0.53i, 0.81+0.59i, 0.64+0.77i, −0.97+0.25i, −0.36+0.93i, 0.92−0.39i, 0.56−0.83i, −0.98−0.20i, −1.0+0.010i, −1.0+0.040i, 0.99+0.13i, 0.45−0.89i, 0.54+0.84i, 0.15−0.99i, 0.50+0.87i, 0.84+0.54i, −0.27+0.96i, 0.15−0.99i, 0.22−0.97i, −0.89−0.46i, −0.80+0.60i, 1.0−0.020i, −0.70−0.71i, −0.22+0.98i, −0.17−0.99i, 0.93−0.36i, 0.38+0.93i, −0.22−0.98i, 0.13−0.99i, −0.79−0.62i, −0.18−0.98i, −0.66+0.75i, 0.97+0.25i, −1.0+0.040i, −0.99+0.15i, −1.0+0.070i, −0.98−0.19i, −0.80−0.59i, 0.30+0.96i, 0.87+0.49i, −0.050−1.0i, −0.91+0.42i, −0.59−0.81i, −0.80+0.60i, 0.89−0.45i, 0.99−0.11i, −0.42+0.91i, 0.40+0.92i, 0.88+0.48i, −0.030+1.0i, −0.97+0.25i, 0.94−0.35i, 0.96−0.27i, 1.0+0.0i, −0.90−0.44i, 0.89−0.46i, −0.94−0.34i, −0.22−0.98i, 0.83−0.56i, −0.71+0.71i, −0.70+0.71i, 0.58+0.82i, 0.25+0.97i, 0.96+0.30i, 0.51+0.86i, −0.93−0.37i, −1.0+0.080i, −0.36−0.93i, −0.90+0.44i, −0.93+0.36i, −0.090−1.0i, −0.93−0.36i, 0.85−0.53i, −0.27+0.96i, 0.28+0.96i, 0.61+0.79i, 0.67−0.75i, 0.67−0.75i, 0.61+0.79i, −0.28−0.96i, 0.27−0.96i, 0.85−0.53i, −0.93−0.36i, −0.10−1.0i, 0.93−0.36i, 0.90−0.44i, 0.93−0.36i, 0.080+1.0i, 0.93+0.37i, 0.51+0.86i, 0.96+0.29i, −0.97+0.25i, 0.82−0.58i, −0.70+0.71i, 0.70−0.71i, −0.83+0.56i, 0.98−0.22i, −0.94−0.33i, 0.88−0.47i, −0.43+0.90i, −1.0+0.010i, 0.27+0.96i, −0.94+0.35i, −0.26−0.97i, 0.030−1.0i, −0.48+0.88i, −0.92+0.40i, 0.91+0.41i, 0.99−0.12i, 0.89−0.46i, −0.80+0.60i, 0.80−0.59i, 0.91−0.42i, 1.0−0.060i, 0.49−0.87i, −0.30−0.95i, −0.59+0.81i, 0.98+0.18i, 1.0−0.080i, −0.16−0.99i, −1.0+0.050i, 0.24−0.97i, 0.66−0.75i, 0.98−0.19i, 0.61−0.79i, −0.12+0.99i, 0.97−0.23i, 0.39+0.92i, 0.93−0.37i, 0.18+0.98i, 0.98+0.21i, −0.71−0.71i, 1.0−0.030i, −0.79+0.61i, 0.89+0.46i, 0.21−0.98i, −0.99−0.14i, 0.97+0.25i, 0.53−0.85i, −0.51−0.86i, −0.14+0.99i, −0.55−0.84i, −0.90−0.44i, 0.99+0.1 1i, −0.050−1.0i, −0.020−1.0i].

After the generation of WUS sequence, the WUS sequence should be mapped onto resource element (RE). Here, the principle of first in time then in frequency is applied as the following. In there, the "x" represents the RE is occupied by control channel or other channel/signal. For example, the first 3 symbols are used for CORESET. The first element of the WUS sequence is placed on the RE of symbol index 3 with the lowest frequency. The second element of the WUS sequence is placed on the RE of symbol index 3 with the second lowest frequency. With this principle, all 264 element of WUS sequence are mapped.

x x x 24 48 72 : 264
x x x : : : : :
x x x 14 38 62 : 254
x x x 13 37 61 : 253
x x x 12 36 60 : 252
x x x : : : : :
x x x 2 26 50 : 242
x x x 1 25 49 : 241

Alternatively, the WUS sequence w(m) can also be carried by Control Channel Element (CCE). Alternatively, the WUS sequence w(m) can also be carried by Control Channel Element (CCE) including all RE (e.g., without DM-RS on it). Because a CCE has RE_per_CCE=6*12=72 RE, then the WUS sequence w(m) above requires Num_CCE=ceil(L_Sequence/RE_per_CCE)=4 CCE. Because the number RE in 4 CCE (e.g., 4*72=288) is greater than the length of sequence, the remainder Num_CCE*RE_per_CCE−L_Sequence=24 RE can repeat the contents of the first 24 RE (e.g., first 24 element of the WUS sequence). Alternatively, the remainder 24 RE can repeat the contents of the last 24 RE (e.g., last 24 element of the WUS sequence). Alternatively, these 24 RE are empty.

Alternatively, the length of WUS sequence can be one or multiple of the number of RE within a CCE. Alternatively, the length of WUS sequence can be power of 2 of the number of RE within a CCE. For example, $2^=4$ times of the number of RE within a CCE. That is, the length of WUS sequence is RE_per_CCE*$2^2$=72*4=288.

Alternatively, the WUS sequence w(m) can also be carried by Control Channel Element (CCE) except DM-RS on it. Because a CCE except DM-RS has RE_per_CCE_withoutDMRS=6*12*(1−¼)=54 RE, then the WUS sequence w(m) above requires Num_CCE=ceil(L_Sequence/RE_per_CCE_withoutDMRS)=5 CCE. Because the number RE in 5 CCE (e.g., 5*54=270) is greater than the length of sequence, the remainder Num_CCE*RE_per_CCE_withoutDMRS−L_Sequence=6 RE can repeat the contents of the first 6 RE (e.g., first 6 element of the WUS sequence). Alternatively, the remainder 6 RE can repeat the contents of the last 6 RE (e.g., last 6 element of the WUS sequence). Alternatively, these 6 RE are empty. Alternatively, because 5 CCE is not the power of 2, the number of CCE should be adjust to a power of 2 that is nearest to the number of CCE, e.g., 4 CCE. Alternatively, the number of CCE should be adjust to a power of 2 that is not less than the number of CCE, e.g., 8 CCE.

Alternatively, the length of WUS sequence can be one or multiple of the number of RE within a CCE except DM-RS on it. Alternatively, the length of WUS sequence can be power of 2 of the number of RE within a CCE. For example, $2^2=4$ times of the number of RE within a CCE. That is, the length of WUS sequence is RE_per_CCE_withoutDMRS*$2^2$=54*4=216.

IV. Detailed Example 3

Detailed Example 3 describes sequence for WUS that can be based on secondary synchronization signal (SSS).

When a UE is in RRC_Idle/RRC_Inactive state, it needs monitor possible paging occasion in each paging cycle. For this case, there may be no PDCCH that schedules the paging or, there is PDCCH that schedules the paging but there is no PDSCH that carries the paging message or, there are PDCCH and PDSCH but the paging message is not for this UE because of inconsistent 5G-S-TMSI. This monitoring possible PO related operation can consume some unnecessary power. For this case, the base station can transmit an indication information before UE monitoring this PO. This indication information can indicate when a UE needs to monitor an incoming PO. This indication information can be carried on Wake up Signal (WUS). This WUS can be present in form of a signal or a sequence or a channel.

After receiving the paging indication (e.g., WUS), a UE can determine whether it should monitor the incoming PO for the next cycle. This can reduce the reception of unnecessary paging. Hence it can save UE's power consumption.

The WUS sequence is generated by the base station with the following equation.

$$d_{WUS}(n) = \begin{matrix}[1 - 2x_0((n + m_0) \bmod L\_Sequence)] \bullet \\ [1 - 2x_1((n + m_1) \bmod L\_Sequence)] \bullet e^{j\frac{2\pi gn}{L\_Sequence}}\end{matrix}$$

$$m_0 = A \bullet \left\lfloor \frac{N_{ID}^{(1)}}{B} \right\rfloor + C \cdot N_{ID}^{(2)}$$

$$m_1 = N_{ID}^{(1)} \bmod B$$

$$0 \leq n < L\_Sequence$$

or, $$d_{WUS}(n) = \begin{matrix}[1 - 2x_0((n + m_0) \bmod L\_Sequence)] \cdot \\ [1 - 2x_1((n + m_1) \bmod L\_Sequence)] \cdot e^{j\frac{2\pi ut(t+1)}{L\_Seq\_Prim}} \cdot e^{j\frac{2\pi gn}{L\_Sequence}}\end{matrix}$$

$$m_0 = A \cdot \left\lfloor \frac{N_{ID}^{(1)}}{B} \right\rfloor + C \cdot N_{ID}^{(2)}$$

$$m_1 = N_{ID}^{(1)} \bmod B$$

$$0 \leq n < L\_Sequence$$

$$t = n \bmod L\_Seq\_Prim$$

wherein the g, u, L_Seq_Prim and L_Sequence are listed in the Detailed Example 2 above. The integer $A=15$, $B=112$, $C=5$, $N_{ID}^{(1)} \in \{0, 1, \ldots, 335\}$, $N_{ID}^{(2)} \in \{0, 1, 2\}$, $N_{ID}^{cell} = 3N_{ID}^{(1)} + N_{ID}^{(2)}$.

The sequence x(n) is generated with the following equation.

$$x_0(i+7) = (x_0(i+4) + x_0(i)) \bmod 2$$

$$x_1(i+7) = (x_1(i+1) + x_1(i)) \bmod 2$$

wherein the sequence x(n) is initialized with the following initialization seed.

$$[x_0(6)\ x_0(5)\ x_0(4)\ x_0(3)\ x_0(2)\ x_0(1)\ x_0(0)] = [0\ 0\ 0\ 0\ 0\ 0\ 1]$$

$$[x_1(6)\ x_1(5)\ x_1(4)\ x_1(3)\ x_1(2)\ x_1(1)\ x_1(0)] = [0\ 0\ 0\ 0\ 0\ 0\ 1]$$

Alternatively, the WUS resource ID $N_{ID}^{resource}$ can be used for the initialization of the sequence x(n). Alternatively, the WUS resource ID $N_{ID}^{resource}$ can be used for the initialization of $x0(6), \ldots, x0(0)$ and/or $x1(6), \ldots x1(0)$. For example, if there are 3 bits for $N_{ID}^{resource}$ (e.g., 8 resources), then $x0(3), x0(2), x0(1)$ have the value of these 3 bits of $N_{ID}^{resource}$. Alternatively, $x0(3)$ has the value of the most significant bit (MSB) of $N_{ID}^{resource}$. For another example, if there are 4 bits for $N_{ID}^{resource}$ (e.g., 16 resources), then $x1(4), x1(3), x1(2), x1(1)$ have the value of these 4 bits of $N_{ID}^{resource}$. Alternatively, $x1(4)$ has the value of the MSB of $N_{ID}^{resource}$ and $x1(1)$ has the value of the least significant bit (LSB) of $N_{ID}^{resource}$. Alternatively, the WUS resource ID $N_{ID}^{resource}=0$ is used by the common WUS. Alternatively, if there is no common WUS configured, the WUS resource ID $N_{ID}^{resource}=0$ can be used for UE group WUS.

Alternatively, the WUS group ID g can be used for the initialization of $x0(6), \ldots, x0(0)$ and/or $x1(6), \ldots, x1(0)$. For example, if there are 3 bits for the WUS group ID g, then $x0(6), x0(5), x0(4)$ have the value of these 3 bits of g. Alternatively, $x0(6)$ has the value of the MSB of g. For another example, if there are 4 bits for g, then $x0(6), x0(5), x0(4)$ have the value of 3 MSB of g and $x1(1)$ has the value of the LSB of g. Alternatively, $x0(6)$ has the value of the MSB of g. Alternatively, the WUS group ID g=0 represents the common WUS. Alternatively, if there is no common WUS configured, the WUS group ID g=0 can be used for UE group WUS.

Alternatively, the radio frame number $n_{f\_start\_PO}$ for the first PO can be used for the initialization of $x0(6), \ldots, x0(0)$ and/or $x1(6), \ldots x1(0)$. Alternatively, the radio frame number $n_{f\_start\_PO}$ for the first PO corresponding to the WUS can be used for the initialization of $x0(6), \ldots, x0(0)$ and/or $x1(6), \ldots, x1(0)$. For example, the $x1(3), x1(2)$ have the value of 2 LSB of $n_{f\_start\_PO}$. Alternatively, the $x1(2)$ has the value of LSB of $n_{f\_start\_PO}$.

Alternatively, the radio slot number $n_{s\_start\_PO}$ for the first PO associated with the WUS can be used for the initialization of $x0(6), \ldots, x0(0)$ and/or $x1(6), \ldots x1(0)$. For example, the $x1(5), x1(4)$ have the value of 2 LSB of $n_{s\_start\_Po}$. Alternatively, the $x1(4)$ has the value of LSB of $n_{s\_start\_PO}$.

Alternatively, the PCI $N_{ID}^{cell}$ can be used for the initialization of $x0(6), \ldots x0(0)$ and/or $x1(6), \ldots, x1(0)$. For example, the $x1(6)$ has the value of LSB of $N_{ID}^{cell}$. Alternatively, a sub-set of the PCI $N_{ID}^{cell}$ can be used for the initialization of $x0(6), \ldots, x0(0)$ and/or $x1(6), \ldots, x1(0)$. For example, $N_{ID}^{cell} \bmod 64$ is used for the initialization of $x0(6), \ldots, x0(1)$ while $x0(0)=1$.

Alternatively, the SSB index ID_SSB can be used for the initialization of $x0(6), \ldots, x0(0)$ and/or $x1(6), \ldots, x1(0)$. For example, the $x1(0)$ has the value of LSB of ID_SSB.

Alternatively, one or more of $N_{ID}^{cell}$, $n_{f\_start\_PO}$, $n_{s\_start\_PO}$, $N_{ID}^{resource}$ and ID_SSB can be used for the initialization of $x0(6), \ldots, x0(0)$ and/or $x1(6), \ldots, x1(0)$. For example, the following seed is used for the initialization of $[x0(6), x0(5), \ldots, x0(1), x0(0), x1(6), x1(5), \ldots, x1(1), x1(0)]$. Alternatively, the last 14 bits (e.g., modulo of $2^{14}$) of the following seed is used for the initialization of $[x0(6), x0(5), \ldots, x0(1), x0(0), x1(6), x1(5), \ldots, x1(1), x1(0)]$.

$$(N_{ID}^{cell}+1)((10n_{f\_start\_PO}+n_{s\_start\_PO}) \bmod E+1) \bmod 2^D + F \cdot N_{ID}^{cell} + N_{ID}^{resource} \cdot 2^D + \text{ID\_SSB}$$

wherein $D=11$ for at most 8 UE group WUS, $D=10$ for at most 16 UE group WUS, F is an integer such as $F=0$, $F=1$.

Alternatively, the last 12 bits (e.g., modulo of $2^{12}$) of the following seed is used for the initialization of $[x0(6), x0(5), \ldots, x0(2), x0(1), x1(6), x1(5), \ldots, x1(2), x1(1)]$ while $x0(0)=x1(0)=1$.

$$(N_{ID}^{cell}+1)((10n_{f\_start\_PO}+n_{s\_start\_PO}) \bmod E+1) \bmod 2^D + F \cdot N_{ID}^{cell} + N_{ID}^{resource} \cdot 2^D + \text{ID\_SSB}$$

wherein $D=9$ for at most 8 UE group WUS, $D=8$ for at most 16 UE group WUS, F is an integer such as $F=0$, $F=1$.

Alternatively, the last 12 bits (e.g., modulo of $2^{12}$) of the following seed is used for the initialization of $[x0(6), x0(5), \ldots, x0(2), x0(1), x1(6), x1(5), \ldots, x1(2), x1(1)]$ while $x0(0)=x1(0)=1$.

$$(N_{ID}^{cell}+1)((10n_{f\_start\_PO}+n_{s\_start\_PO}) \bmod E+1) \bmod 2^D + F \cdot N_{ID}^{cell} + N_{ID}^{resource} \cdot 2^D + \text{ID\_SSB} \cdot 2^G$$

wherein $D=9$ for at most 8 UE group WUS, $D=8$ for at most 16 UE group WUS, F is an integer such as $F=0$, $F=1$, G is an integer such as $G=4$. Alternatively, for FR 1, $G=7$, for FR 2, $G=4$.

Alternatively, the last 12 bits (e.g., modulo of 2^12) of the following seed is used for the initialization of [x0(6), x0(5), ..., x0(2), x0(1), x1(6), x1(5), ..., x1(2), x1(1)] while x0(0)=x1(0)=1.

$$(H \cdot N_{ID}^{cell}+1)((10n_{f\_start\_PO}+n_{s\_start\_PO})+1) \bmod 2^D + F \cdot N_{ID}^{cell} + N_{ID}^{resource} \cdot 2^D + \text{ID\_SSB} \cdot 2^G$$

wherein D=9 for at most 8 UE group WUS, D=8 for at most 16 UE group WUS, F is an integer such as F=0, F=1, G is an integer such as G=4. H an integer such as H=0, H=1.

Alternatively, the last 12 bits (e.g., modulo of 2^12) of the following seed is used for the initialization of [x0(6), x0(5), ..., x0(2), x0(1), x1(6), x1(5), ..., x1(2), x1(1)] while x0(0)=x1(0)=1.

$$(H \cdot \text{ID\_SSB}+1)((10n_{f\_start\_PO}+n_{s\_start\_PO})+1) \bmod 2^D + F \cdot N_{ID}^{cell} + N_{ID}^{resource} \cdot 2^D$$

wherein D=8 for at most 16 UE group WUS, D=9 for at most 8 UE group WUS, D=10 for at most 4 UE group WUS, F is an integer such as F=0, F=1, H an integer such as H=0, H=1.

Alternatively, the last 12 bits (e.g., modulo of 2^12) of the following seed is used for the initialization of [x0(6), x0(5), ..., x0(2), x0(1), x1(6), x1(5), ..., x1(2), x1(1)] while x0(0)=x1(0)=1.

$$(H \cdot \text{ID}_{SSB}+1)((10n_{f\_start\_PO}+n_{s\_start\_PO})+1) \bmod 2^D + F \cdot N_{ID}^{cell} + N_{ID}^{resource} \cdot 2^D + P \cdot \text{ID\_SSB}$$

wherein D=8 for at most 16 UE group WUS, D=9 for at most 8 UE group WUS, D=10 for at most 4 UE group WUS, F is an integer such as F=0, F=1, H an integer such as H=0, H=1, P is an integer such as P=0, 1, 32.

V. Detailed Example 4

Detailed Example 4 describes sequence for WUS that can be based on primary synchronization signal (PSS).

When a UE is in RRC_Idle/RRC_Inactive state, it needs monitor possible paging occasion in each paging cycle. For this case, there may be no PDCCH that schedules the paging or, there is PDCCH that schedules the paging but there is no PDSCH that carries the paging message or, there are PDCCH and PDSCH but the paging message is not for this UE because of inconsistent 5G-S-TMSI. This monitoring possible PO related operation can consume some unnecessary power. For this case, the base station can transmit an indication information before UE monitoring this PO. This indication information can indicate when a UE needs to monitor an incoming PO. This indication information can be carried on Wake up Signal (WUS). This WUS can be present in form of a signal or a sequence or a channel.

After receiving the paging indication (e.g., WUS), a UE can determine whether it should monitor the incoming PO for the next paging cycle. This can reduce the reception of unnecessary paging. Hence it can save UE's power consumption.

The WUS sequence is generated by the base station with the following equation.

$$d_{WUS}(n) = [1 - 2x(m)] \cdot e^{-j\frac{2\pi ut(t+1)}{L\_Seq\_Prim}} \cdot e^{j\frac{2\pi gn}{L\_Sequence}}$$

$$m = (n + Q \cdot N_{ID}^{(2)}) \bmod L\_Sequence$$

$$0 \leq n < L\_Sequence$$

$$t = m \bmod L\_Seq\_Prim$$

$$d_{WUS}(n) = [1 - 2x(m)] \cdot e^{j\frac{2\pi gn}{L\_Sequence}}$$

$$m = (n + Q \cdot N_{ID}^{(2)}) \bmod L\_Sequence$$

$$0 \leq n < L\_Sequence$$

wherein the g, u, L_Seq_Prim and L_Sequence can be found in the Detailed Example 2, the integer Q=43, the integer $N_{ID}^{(2)} \in \{0, 1, 2\}$, the sequence x(n) is generated as the following.

$$x(i+7)=(x(i+4)+x(i)) \bmod 2$$

or, $$x(i+7)=(x(i+R)+x(i)) \bmod 2$$

or, $$x(i+7)=(x(i+R)+x(i+S)+x(i)) \bmod 2$$

wherein the integer R=4, the integer S=6.

The sequence x(n) is initialized with the following initialization seed.

$$[x(6)\ x(5)\ x(4)\ x(3)\ x(2)\ x(1)\ x(0)]=[1\ 1\ 1\ 0\ 1\ 1\ 0]$$

or, $$[x(6)\ x(5)\ x(4)\ x(3)\ x(2)\ x(1)\ x(0)]=[1\ 0\ 0\ 0\ 0\ 0\ 0]$$

or, $$[x(6)\ x(5)\ x(4)\ x(3)\ x(2)\ x(1)\ x(0)]=[0\ 0\ 1\ 0\ 0\ 0\ 0]$$

or, $$[x(6)\ x(5)\ x(4)\ x(3)\ x(2)\ x(1)\ x(0)]=[0\ 0\ 0\ 0\ 0\ 0\ 1]$$

or, $$[x(6)\ x(5)\ x(4)\ x(3)\ x(2)\ x(1)\ x(0)]=[0\ 0\ 0\ 0\ 0\ 1\ 0]$$

Alternatively, the WUS resource ID $N_{ID}^{resource}$ can be used for the initialization of the sequence x(n). Alternatively, the WUS resource ID $N_{ID}^{resource}$ can be used for the initialization of x(6), ..., x(0). For example, if there are 3 bits for $N_{ID}^{resource}$ (e.g., 8 resources), then x(3), x(2), x(1) have the value of these 3 bits of $N_{ID}^{resource}$ while x(0)=1. Alternatively, x(3) has the value of the MSB of $N_{ID}^{resource}$. For another example, if there are 4 bits for $N_{ID}^{resource}$ (e.g., 16 resources), then x(4), x(3), x(2), x(1) have the value of these 4 bits of $N_{ID}^{resource}$ while x(0)=1. Alternatively, x(4) has the value of the MSB of $N_{ID}^{resource}$ and x(1) has the value of the LSB of $N_{ID}^{resource}$.

Alternatively, the WUS group ID g can be used for the initialization of x(6), ..., x(0). For example, if there are 3 bits for the WUS group ID g, then x(3), x(2), x(1) have the value of these 3 bits of g while x(0)=1. Alternatively, x(3) has the value of the MSB of g. For another example, if there are 4 bits for g, then x(4), x(3), x(2), x(1) have the value of 4 bits of g while x(0)=1. Alternatively, x(4) has the value of the MSB of g. Alternatively, x(1) has the value of the LSB of g.

Alternatively, the radio frame number $n_{f\_start\_PO}$ for the first PO can be used for the initialization of x(6), ..., x(0). Alternatively, the radio frame number $n_{f\_start\_PO}$ for the first PO corresponding to the WUS can be used for the initialization of x(6), ..., x(0). For example, the x(3), x(2) have the value of 2 LSB of $n_{f\_start\_PO}$. Alternatively, the x(2) has the value of LSB of $n_{f\_start\_PO}$.

Alternatively, the radio slot number $n_{s\_start\_PO}$ for the first PO associated with the WUS can be used for the initialization of x(6), ..., x(0). For example, the x(5), x(4) have the value of 2 LSB of $n_{s\_start\_PO}$. Alternatively, the x(4) has the value of LSB of $n_{s\_start\_PO}$.

Alternatively, the PCI $N_{ID}^{cell}$ can be used for the initialization of x(6), ..., x(0). For example, the x(6) has the value of LSB of $N_{ID}^{cell}$. Alternatively, a sub-set of the PCI $N_{ID}^{cell}$ can be used for the initialization of x(6), ..., x(0). For example, $N_{ID}^{cell}$ mod 64 is used for the initialization of x(6), ..., x(1) while x(0)=1.

Alternatively, the SSB index ID_SSB can be used for the initialization of x(6), ..., x(0). For example, the x(1) has the value of LSB of ID_SSB while x(0)=1.

Alternatively, one or more of $N_{ID}^{cell}$, $n_{f\_start\_PO}$, $n_{s\_start\_PO}$, $N_{ID}^{resource}$ and ID_SSB can be used for the initialization of x(6), ..., x(0). For example, the following seed is used for the initialization of [x(6), x(5), ..., x(0)]. Alternatively, the last 7 bits (e.g., modulo of 2^7) of the following seed is used for the initialization of [x(6), x(5), ..., x(0)].

$$[(N_{ID}^{cell}+1)((10n_{f\_start\_PO}+n_{s\_start\_PO})\text{mod } E+1)\text{mod} \\ 2^D + F \cdot N_{ID}^{cell} + N_{ID}^{resource} \cdot 2^D + \text{ID\_SSB}] \text{ mod } 2^T$$

wherein D=2 for at most 8 UE group WUS, D=3 for at most 16 UE group WUS, integer E=2048, F is an integer such as F=0, F=1, integer T=6. Alternatively, x(6)=1. Alternatively, T=7, x(0)=1.

Alternatively, the WUS should occupy resource first in frequency domain (e.g., FDM) then in code domain (e.g., Code Division Multiplexing (CDM), e.g., the same frequency resource is used but with different scramble sequence or cover sequence to differential each other). The benefit is that the power boosting can be applied for WUS.

Alternatively, each UE group WUS uses the identical sequence but with different initialization seed. Alternatively, each UE group WUS uses the same base sequence but with different initialization seed. For example, the UE group index is used to initial the sequence. For example, the sequence x(n)=PN*exp(j*u*n*(n+1)/K) is used for each UE group WUS. Wherein the PN is the base sequence with initialization seed and K is an integer. In addition, the root value u can be different for each UE group WUS.

Alternatively, each UE group WUS uses the same sequence with different shift. For example, after a sequence with length 2K is generated, the first K elements are assigned for the first UE group WUS and the rest elements for the second UE group WUS. For another example, after a sequence with length K is generated, this sequence is assigned for the first UE group WUS. After that, the sequence is shifted in cycle (e.g., the shifted out element will be the head or tail element). Then the shift sequence is assigned for the second UE group WUS. Alternatively, the shift value can be one or multiple of SSB. Alternatively, the shift value can be one or multiple of actually transmitted SSB. Alternatively, the shift value can be one or multiple of the highest index of SSB plus one. For example, if the SSB index is 0, 1, 2, ..., 7, then the shift value is 7+1=8. For another example, the sequence for the ith UE group WUS is $$\text{Seq}_i(k) = \text{Seq}_{Original}((k+i \cdot \text{floor}(N/G)) \text{ mod } N)$$

wherein the N is the length of sequence, G is the total number of UE group WUS, i=0, 1, 2, ..., G-1.

VI. Detailed Example 5

Detailed Example 5 describes WUS based on a reference signal.

When a UE is in RRC_Idle/RRC_Inactive state, it needs monitor possible paging occasion in each paging cycle. For this case, there may be no PDCCH that schedules the paging or, there is PDCCH that schedules the paging but there is no PDSCH that carries the paging message or, there are PDCCH and PDSCH but the paging message is not for this UE because of inconsistent 5G-S-TMSI. This monitoring possible PO related operation can consume some unnecessary power. For this case, the base station can transmit an indication information before UE monitoring this PO. This indication information can indicate when a UE needs to monitor an incoming PO. This indication information can be carried on Wake up Signal (WUS). This WUS can be present in form of a signal or a sequence or a channel.

After receiving the paging indication (e.g., WUS), a UE can determine whether it should monitor the incoming PO for the next paging cycle. This can reduce the reception of unnecessary paging. Hence it can save UE's power consumption.

Alternatively, the system information may change. Then the WUS can be used to indicate whether the system information changes or not. For example, if the original system information were still valid, then an indication "0" can be indicated by a WUS that the system information does not change. If the original system information were invalid, then an indication "1" can be indicated by a WUS that the system information does change. Alternatively, an indication "1" can be indicated by a WUS that the system information will change some time later, e.g., at next transmission period, e.g., 320 ms later. Alternatively, the common WUS is used to indicate the system information change. Alternatively, the system information change is carried by the common WUS.

The WUS sequence is generated with the following equation.

$$WUS(n) = \frac{1 - 2c(2n)}{\sqrt{2}} + j*\text{base}(i)*\frac{1 - 2c(2n+1)}{\sqrt{2}},$$
$$n = 0, 1, ..., L\_Sequence - 1$$

where base(i) is a base sequence at the ith transmission of WUS, L_Sequence is the length of sequence, e.g., L_Sequence=264, the c(n) is pseudo-random sequence as in previous example. The pseudo-random sequence generator is initialised in each time slot as the following.

$$c_{init} = N_{ID}^{cell} + SI\_Change * 2^{N\_Index}$$

wherein the $N_{ID}^{cell}$ is PCI, it is an integer such as 0-1007, the SI_Change indicates whether the system information changes or not. The SI_Change is an integer such as 0, 1. Alternatively, The SI_Change is configured by higher layer. Alternatively, N_Index is an integer that the $2^{N\_Index}$ is greater than $N_{ID}^{cell}$.

Alternatively, the base(i) is generated according to the index of SSB associated with the ith transmission of WUS. For example, it can be base(i)=1−2·(Index_SSB(i)mod 2)

where Index_SSB(i) is the index of SSB associated with the ith transmission of WUS. For example, the Index_SSB(i) can be 0, 1, 2, ..., 7 for 8 SSB.

Alternatively, the base(i) is configured by higher layer or protocol layer. Alternately, the base(i) is generated according to the UE group index as the following example.

base(i)=1−2·((Index_SSB(i)+Group)mod 2)

where the Group is the UE group index. For example, the Group can be 0, 1, 2, ..., 7 for 8 UE groups. For another example, the Group can be 0, 1, 2, 3 for 4 UE groups.

Alternatively, the base(i) is configured by higher layer or protocol layer. Alternately, the base(i) is generated according to the WUS resource index as the following example.

$$base(i)=1-2\cdot((Index\_SSB(i)+Resource)\bmod 2)$$

where the Resource is the WUS resource index. For example, the Resource can be 0, 1, 2, 3 for 4 WUS resources. Alternately, the WUS resources associated with the UE group index.

Alternately, the base(i) is generated according to the system information change indication as the following example.

$$base(i)=1-2\cdot((Index\_SSB(i)+SI\_Change)\bmod 2)$$

where the SI_Change is the system information change indication. For example, the SI_Change can be 0,1.

Alternately, the base(i) can be fixed as 1 or −1. Alternately, the pseudo-random sequence generator is initialized with SSB index as the following.

$$c_{init}=N_{ID}^{cell}+SI\_Change*2^{N\_Index}+Index\_SSB*2^{S\_Index}$$

where Index_SSB is SSB index, S_Index is an integer such as S_Index=11 or S_Index=1+N_Index.

Alternately, the pseudo-random sequence generator is initialized with WUS resource index as the following.

$$c_{init}=N_{ID}^{cell}+SI\_Change*2^{N\_Index}+Index\_SSB*2^{S\_Index}+WUSResouce*2^{R\_Index}$$

where WUSResouce is WUS resource index, R_Index is an integer such as R_Index=14 or R_Index=1+S_Index. Alternately, if there were 8 SSB then R_Index is an integer such as R_Index=14 or R_Index=3+S_Index. Alternately, if there were 64 SSB then R_Index is an integer such as R_Index=17 or R_Index=6+S_Index.

Alternately, the pseudo-random sequence generator is initialized with UE Group index as the following.

$$c_{init}=N_{ID}^{cell}+SI\_Change*2^{N\_Index}+Index\_SSB*2^{S\_Index}+WUSResouce*2^{R\_Index}+Group*2^{G\_Index}$$

where Group is UE Group index, G_Index is an integer such as G_Index=17 or G_Index=6+R_Index. Alternately, if there were 4 WUS resources then R_Index is an integer such as G_Index=16 or G_Index=5+R_Index. Alternately, if there were 8 WUS resources then R_Index is an integer such as G_Index=17 or G_Index=6+R_Index. Alternately, if there were 16 WUS resources then R_Index is an integer such as G_Index=18 or G_Index=7+R_Index.

Alternately, a WUS can repeat multiple times. For example, it can be transmitted with the same number of transmission of SSB. For another example, each transmission of WUS is corresponding to one of the SSB transmission. A transmission of WUS on a specific beam is associated with the transmission of SSB on the same beam.

Alternately, the base sequence base(i) is fixed as 1 for each repetition. Alternately, the base sequence base(i) is fixed as [1, −1] cycle for each repetition, e.g., [1, −1, 1, −1, 1, −1, 1, −1] for 8 repetitions. Alternately, the base sequence base(i) is fixed as [−1,−i,1,1,−i1,−1,1] for 8 repetitions.

Alternately, the WUS can trigger aperiod/semi-period CSI-RS for Automatic Gain Control (AGC), synchronization, Radio Resource Management (RRM) measurement in UE. That is, the configuration of CSI-RS can be indicated by a WUS. That is, the WUS can indicate the presence of CSI-RS. Alternately, the base station configures a semi-period CSI-RS for paging processing while it can be indicated by a WUS. Alternately, the base station configures a semi-period CSI-RS for paging processing while it can be indicated by a WUS after the activation of semi-period CSI-RS by a WUS. In addition, the semi-period CSI-RS is de-activated after its configuration.

Alternately, the WUS can trigger aperiod/semi-period SSS/SSB. Alternately, the base station configures a semi-period SSS/SSB for paging processing while it can be indicated by a WUS. Alternately, the base station configures a semi-period SSS/SSB for paging processing while it can be indicated by a WUS after the activation of semi-period CSI-RS by a WUS. In addition, the semi-period SSS/SSB is de-activated after its configuration.

VI. Detailed Example 6

Detailed Example 6 describes WUS included in a channel (e.g., PDCCH) or in a form of a channel.

When a UE is in RRC_Idle/RRC_Inactive state, it needs monitor possible paging occasion in each paging cycle. For this case, there may be no PDCCH that schedules the paging or, there is PDCCH that schedules the paging but there is no PDSCH that carries the paging message or, there are PDCCH and PDSCH but the paging message is not for this UE because of inconsistent 5G-S-TMSI. This monitoring possible PO related operation can consume some unnecessary power. For this case, the base station can transmit an indication information before UE monitoring this PO. This indication information can indicate when a UE needs to monitor an incoming PO. This indication information can be carried on Wake up Signal (WUS). This WUS can be present in form of a signal or a sequence or a channel.

After receiving the paging indication (e.g., WUS), a UE can determine whether it should monitor the incoming PO for the next paging cycle. This can reduce the reception of unnecessary paging. Hence it can save UE's power consumption. If the WUS indicated that the UE can stop receive the incoming PO, then the UE can skip receive the incoming PO and the SSB between WUS and PO. Hence the UE can save power consumption.

In this example, the WUS carrying paging indication is transmitted in form of PDCCH within a search space. Some search space or search space set can be configured for WUS. Alternatively, WUS has N search space(s) where the N is a positive integer. Alternatively, WUS has N=1 search space where both the common WUS and UE group WUS are transmitted in this search space. Alternatively, WUS has N=1 search space where both the common WUS and UE group WUS are transmitted in this search space but with different CCE. Alternatively, WUS has N=2 search spaces where the common WUS is transmitted in one search space while the UE group WUS is transmitted in the other search space. Alternatively, WUS has N=2 search spaces where the common WUS is transmitted in one search space with lowest index while the UE group WUS can be transmitted in any one of the search space.

Alternatively, the common WUS is transmitted in the search space with index 0 (e.g., searchSpaceZero or SearchSpace #0). Alternatively, the common WUS is transmitted only in the search space with index 0 (e.g., searchSpaceZero or SearchSpace #0). Alternatively, the common WUS can be transmitted in the search space with an index other than zero. Alternatively, the UE group WUS can be transmitted in the search space with index 0.

Alternatively, the aggregation level (AL) of a search space for WUS can be 4, 8, 16, 32. The corresponding number of candidate(s) for these AL are 4, 2, 1, 1. Alternatively, both the AL and number of candidates are set 4.

Alternatively, the PCI can be used to compute the candidate CCE location (e.g., the first CCE index of a candidate, or the start CCE index of a candidate) as the following.

$$SS(i)=(AL*(i+(A*PCI)\bmod G))\bmod N\_CCE$$

wherein the i=0, . . . , M−1, the G is the total number of UE group WUS, the A is a constant such as A=65535, the N_CCE is the total number of CCE in this search space.

Alternatively, the SSB index can be used to compute the candidate CCE location (e.g., the first CCE index of a candidate) as the following.

$$SS(i)=(AL*(i+(A*PCI+C*SSB)\bmod G))\bmod N\_CCE$$

wherein the C is a constant such as C=65537, SSB is the SSB index such as SSB=0, 1, 2, . . . , 7.

Alternatively, the UE group WUS index or the UE group index can be used to compute the candidate CCE location (e.g., the first CCE index of a candidate) as the following.

$$SS(i)=(AL*(i+j+(A*PCI)\bmod G))\bmod N\_CCE$$

wherein the j is the UE group WUS index or the UE group index, it is an integer.

Alternatively, the WUS resource index can be used to compute the candidate CCE location (e.g., the first CCE index of a candidate) as the following.

$$SS(i)=(AL*(i+(B*k+A*PCI)\bmod G))\bmod N\_CCE$$

wherein the k is the WUS resource index, the k is an integer such as 0~100, the B is a constant such as B=32767. Alternatively, k=0, 1, 2, . . . , G−1.

Alternatively, the WUS resource index or the UE group WUS resource index is determined by CCE index. Alternatively, the WUS resource index or the UE group WUS resource index is determined by the start CCE index. Alternatively, the start CCE index that satisfies the following equation is with the start CCE used by a UE group WUS. Alternatively, the grouping ID of the UE group is used to determine the start number of CCE for the WUS.

CCE_Start=AL·ResourceID or

CCE_Start=mod((AL·ResourceID),N_CCE) or

CCE_Start=mod((AL·(ResourceID+A·PCI)),N_CCE) or

CCE_Start=mod((AL·(GroupingID+A·PCI)),N_CCE)

wherein the CCE_Start is the start CCE index used by a UE group WUS (or UE group WUS resource). The ResourceID is UE group WUS resource index. The GroupingID is the grouping ID of the UE group. The N_CCE is the total number of CCE in a search space. The AL is aggregation level where AL=1, 2, 4, 8, 16, 32. For example, if N_CCE=16, AL=4, there are 4 UE group WUS, then the start CCE index of the UE group WUS{0, 1, 2, 3} is {0, 4, 8, 12} respectively.

Alternatively, the common WUS uses a specific resource ID of WUS. For example, the common WUS uses a specific resource ID 0, e.g., the CCE that start(s) with CCE index 0. Alternatively, if the common WUS is configured, the common WUS uses a specific resource ID of WUS.

Alternatively, the resource ID of WUS is mapped one to one with the index of UE group WUS. Alternatively, the resource ID of WUS is equal to the index of UE group WUS. Alternatively, the resource ID of WUS has the value of the index of UE group WUS. Alternatively, the resource ID of WUS is a sub-set of the index of UE group WUS. For this case, the index of UE group WUS is the modulo of the total number of WUS resource. Alternatively, the index of UE group WUS is a sub-set of the index of the resource ID of WUS.

One or more CORESET are required for WUS transmission. Alternatively, the CORESET with index 0 (CORESET 0) is used by a WUS. Alternatively, the common WUS uses CORESET 0. The CORESET used by the PDCCH that schedules paging message (e.g., the CORESET associated with pagingSearchSpace) is used by a WUS. Alternatively, The CORESET used by the PDCCH that schedules paging message is used by the common WUS. Alternatively, the CORESET used by a WUS can be a CORESET with interleaving.

Alternatively, a specific CORESET is configured for WUS. For example, the CORESET can be configured with one symbol in duration (e.g., the first symbol of a slot, e.g., symbol 0). For example, the CORESET can be configured with one symbol in duration and 96 PRB in frequency domain. For another example, the CORESET can be configured with two symbols in duration and 48 PRB in frequency domain with interleaving.

Alternatively, the power boosting can be applied to PDCCH that associated with this CORESET. The linear value of power boosting is 1, 1.5, 2, 3, 5, 10 (e.g., 0, 1.8, 3, 4.8, 7.10 dB in logarithmic domain). Alternatively, the power boosting of WUS is defined the power of WUS relative to the power of SSB. Alternatively, the power boosting of WUS is defined the power of WUS relative to the energy per resource element (EPRE) of SSB. Alternatively, the power boosting of WUS is defined the power of Demodulation Reference signal (DM-RS) of WUS relative to the EPRE of SSB. Alternatively, the power boosting of WUS is defined the EPRE of DM-RS of WUS relative to the EPRE of SSB. Alternatively, the power boosting of WUS is defined according to the specific SCS. Alternatively, the power boosting of the WUS is that the EPRE of the DM-RS of the channel has a power offset relative to the EPRE of SSB. For example, the SCS of SSB is 15 kHz but the SCS of WUS is 30 kHz, the nominal linear power offset is B0, then the actual linear power offset is B1=B0*SCS_WUS/SCS_SSB=2*B0, wherein the SCS_SSB is the SCS of SSB and SCS_WUS is the SCS of WUS.

Alternatively, the WUS has the following block structure where N blocks are supported. That is, N groups of UE can be indicated by a WUS. Alternatively, the CRC is attached at the end. Alternatively, the CRC has 24 bits.

| Block 1 | Block 2 | ... | Block N | Cyclic redundancy check (CRC) |
| --- | --- | --- | --- | --- |

Alternatively, each block has the following structure. Wherein the IndicatorInformation will indicate the operation of UE associated with the WUS with WUS index of GroupWUSID.

IndicatorInformation+GroupWUSID

As the result of that, the DCI size of WUS is (N_Indicator+Width_GroupWUSID)*N+CRC. Wherein the N_Indicator is the number of bits in the IndicatorInformation above, Width_GroupWUSID is the number of bits in the GroupWUSID.

Alternatively, the grouping ID (e.g., the GroupWUSID) is carried on the frozen bit of the WUS when encoding the DCI of WUS. Alternatively, the grouping ID is carried on one or more frozen bits with the highest reliability. For example, if the DCI size of WUS is 36 bits (including CRC) and, there are 3 bits for GroupWUSID and the Polar code with length 256 is used for channel coding, then these 36 bits will occupy 36 sub-channels with the highest reliability. The rest 256−36=220 sub-channels are set as frozen bit. Within these 220 sub-channels, 3 sub-channels with the highest reliability are selected for carrying 3 bits of GroupWUSID. The other 220−3=217 sub-channels are set 0.

Alternatively, after channel coding, the code-word bits can be scrambled. During bit scrambling, the scrambling sequence used for bit scrambling can be initialized with SSB index. Alternatively, During bit scrambling, the scrambling sequence used for bit scrambling can be initialized with index of SSB that is associated with the WUS. Alternatively, during bit scrambling, the scrambling sequence used for bit scrambling can be initialized with index of the actually transmitted SSB (and received by UE) that is associated with the WUS. During bit scrambling, the scrambling sequence used for bit scrambling can be initialized with UE grouping ID.

Alternatively, if there were one bit IndicatorInformation (e.g., N_Indicator=1), the IndicatorInformation can indicate the incoming operation. Alternatively, the IndicatorInformation can indicate whether a UE or UE group should wake up or continue to sleep. Alternatively, the IndicatorInformation can indicate whether a UE or UE group should monitor the incoming PO or not. Alternatively, the IndicatorInformation can indicate whether a UE or UE group should monitor the PO in the next paging cycle or not. Alternatively, the IndicatorInformation can indicate whether a UE or UE group should receive the incoming PO or not. Alternatively, the IndicatorInformation can indicate whether a UE or UE group should monitor the PO in the next one or more paging cycles or not. Alternatively, the IndicatorInformation can indicate whether a UE or UE group can skip the incoming PO or not. Alternatively, the IndicatorInformation with the value "1" indicates a UE or UE group should monitor the incoming PO. Alternatively, the IndicatorInformation with the value "0" indicates a UE or UE group skip the incoming PO. Alternatively, the IndicatorInformation with the value "0" indicates a UE or UE group should monitor the PO in the next paging cycle. Alternatively, the IndicatorInformation with the value "1" indicates a UE or UE group skip the PO in the next paging cycle.

Alternatively, if there were two bits IndicatorInformation (e.g., N_Indicator=2), the IndicatorInformation can indicate whether a UE should perform measurement or not. Alternatively, if there were two bits IndicatorInformation (e.g., N_Indicator=2), the IndicatorInformation can indicate whether a UE should system information change or not.

Alternatively, a WUS carries extended UE ID (e.g., a sub-set of 5G-S-TMSI or UE ID).

Alternatively, each block has the following structure. Wherein the IndicatorInformation will indicate the operation of UE associated with the WUS with WUS index of GroupWUSID.

IndicatorInformation+GroupWUSID+CSI_RS_Configuration wherein the CSI_RS_Configuration can indicate the configuration of Channel State Information-Reference Signal (CSI-RS). Alternatively, the CSI_RS_Configuration can indicate the configuration of Non-Zero Power (NZP) CSI-RS. Alternatively, the CSI_RS_Configuration can indicate the configuration of NZP CSI-RS of other UE. The CSI_RS_Configuration can have 0 or one or more bits. Alternatively, the CSI_RS_Configuration can indicate which group of the CSI-RS configuration is available.

Alternatively, for UE under RRC_Idle or RRC_Inactive, the DCI size of WUS can be different from the DCI size for UE under RRC_Connected. Alternatively, the DCI size of WUS can be different from that of the DCI scheduling paging message. Alternatively, the DCI size for UE under RRC_Connected will not counted in the DCI Size budget for UE under RRC_Idle or RRC_Inactive. Alternatively, the DCI size of WUS is configured by higher layer.

Alternatively, the CRC bits of WUS can be scrambled by paging RNTI (with a value of 0xFFFE). Alternatively, the CRC bits of WUS can be scrambled by a new paging RNTI (e.g., with a value of 0xFFFD). Alternatively, the DCI size of WUS is the same to that of the DCI scheduling paging message but with different RNTI (e.g., new RNTI, 0xFFFD) for scrambling. Alternatively, the DCI size of WUS is the different from that of the DCI scheduling paging message and with the same RNTI for scrambling. Alternatively, the CRC bits of WUS can be scrambled by power saving RNTI (PS-RNTI). Alternatively, when the WUS is monitored by UE under RRC_Connected, the UE specific cell RNTI (C-RNTI), or configured scheduled RNTI (CS-RNTI), or modulation coding scheme C-RNTI (MCS-C-RNTI) or PS-RNTI can be used for CRC bits scrambling.

Alternatively, the WUS is transmitted on paging-SearchSpace that schedules paging message (e.g., the WUS is transmitted at the same time with the DCI/PDCCH that schedules paging message). When a UE monitors the pagingSearchSpace, it will decode WUS first before decoding the PDCCH that schedules paging message. Alternatively, the UE operates according to the indication of WUS. Alternatively, the UE operates on the PDCCH that schedules paging message according to the indication of WUS. Alternatively, the UE operates on the PDSCH that carries paging message according to the indication of WUS. If the indication of WUS indicates UE can skip PDCCH (and PDSCH further), then some power consumption in UE can be saved.

Alternatively, for the search space configuration of WUS, except monitoringSlotPeriodicityAndOffset and/or search space ID, the search space of WUS has the same configuration to that of pagingSearchSpace that schedules paging message. For example, if the monitoringSlotPeriodicityAndOffset of pagingSearchSpace is configured as "sl1280" with a value of "50" (e.g., the paging cycle is P=1280 ms, offset O=50 ms, this example is for SCS=15 kHz) and, the WUS is transmitted Offset millisecond (Offset=0, 40, 60, 80, 120, 160, 200, 240, 280, 320 ms) before PO, then the configuration of search space of WUS should be that the monitoringSlotPeriodicityAndOffset is "sl1280" with a value "(O-Offset+P) mod P". When the Offset is [0, 40, 80, 160, 240 ms], the monitoringSlotPeriodicityAndOffset is "sl1280" with a value [50 ms, 10 ms, 1250 ms, 1170 ms, 1090 ms] respectively. Alternatively, if the unit of Offset were slot, then the number of slot is Offset·$2^u$, wherein the u is the configuration of SCS (0, 1, 2, 3, 4 for a SCS of 15, 30, 60, 120, 240 kHz).

Alternatively, besides with different Offset above, the duration of the search space of WUS (marked as Duration Paging) can be different from that of pagingSearchSpace. For example, the configuration of the duration of the search space of WUS is configured as M_Repeat=1, 2, 4, 8, 16, 32 slot(s). Alternatively, the configuration of the duration of the search space of WUS is configured as max(M_Repeat, Duration Paging). Alternatively, the configuration of the duration of the search space of WUS is configured as min(M_Repeat, Duration_Paging). Alternatively, if the time offset between WUS and PO is defined as Gap_WUS, then the duration of WUS plus Gap_WUS is equal to the Offset above.

Alternatively, the WUS resource is defined according to the Gap_WUS. Alternatively, different Gap_WUS has different WUS resource. Alternatively, different Gap_WUS has different WUS resource ID. For example, the WUS that has the smallest Gap_WUS occupies the WUS resource with the lowest resource ID. Alternatively, different Gap_WUS has different time/frequency resource. Alternatively, different Gap_WUS has different CORESET. Alternatively, the CORESET occupied by a WUS is determined by Gap_WUS. For example, the WUS with the smallest Gap_WUS occupies the CORESET with the lowest index. Alternatively, the search space occupied by a WUS is determined by Gap_WUS. For example, the WUS with the smallest Gap_WUS occupies the search space with the lowest index.

Alternatively, the periodicity of the search space for WUS (marked as P_WUS) can be different from that of paging-SearchSpace for paging (e.g., P). Alternatively, the periodicity of the search space for WUS is one or more times of that of pagingSearchSpace for paging e.g., P_WUS=N*P. Wherein the N is an integer. Alternatively, the N is the number paging cycles that is skipped according to the indication of WUS. Alternatively, the N is the number paging cycles that is relaxed according to the indication of WUS. Alternatively, the N is the number paging cycles without RRM measurement that is relaxed according to the indication of WUS. Alternatively, N=1, 2, 4, 8, 16. Alternatively, the N is configured by higher layer. Alternatively, the N is configured by the WUS.

Alternatively, after receiving WUS, a UE can skip N paging cycle(s). Alternatively, after receiving WUS with an indication of "skipping", a UE can skip N paging cycle(s). Because a UE reduce the reception of possible paging, a UE can reduce power consumption. Alternatively, after a successful decoding of WUS, a UE can stop monitoring of N paging cycle(s). Alternatively, after a successful decoding of WUS, a UE can stop incoming paging cycle(s). Alternatively, after a successful decoding of WUS, a UE can stop monitoring of WUS. Alternatively, after a successful decoding of WUS, a UE can stop monitoring of WUS within the duration of WUS. Alternatively, after a successful decoding of WUS, a UE can stop monitoring of WUS within the maximum duration of WUS. Alternatively, after a successful decoding of WUS which CRC is scrambled by P-RNIT, a UE can stop monitoring of WUS within the maximum duration of WUS. Because a UE reduce the reception of possible WUS, a UE can reduce power consumption.

Alternatively, a UE can decode the WUS with the maximum likelihood (ML) scheme. For example, if the WUS had T=4 bits of indication information and, 12−T=8 padding bits and 24 CRC bits, then a UE can decode the WUS with ML by testing $2^4=16$ code-word. This can reduce power consumption relative to other decoding scheme.

Alternatively, multiple search spaces for PDCCH that schedules paging message are configured by a base station. The base station broadcasts the grouping rules for UE, e.g., via system information block (SIB) broadcast or, specification on protocol (e.g., RRC protocol in 3GPP).

Alternatively, when there is a system information change to be informed to UE, the base station can stop transmission of WUS (e.g., it shall not transmit the WUS). For example, if the one bit indication of "system information change" were "1", then it indicates there is a system information change. If the one bit indication of "system information change" were "0", then it indicates there is no system information change. When there is a system information change, a UE should wake up to receive the new system information. Alternatively, the indication of system information change is carried on the common WUS. Alternatively, when a UE does not successfully decode a WUS, the UE operates as a legacy UE (e.g., Rel-15 UE or Rel-16 UE). That is, a UE should wake up to monitor the possible incoming PO. Alternatively, when a UE does not successfully decode a WUS, the UE will not monitor the possible incoming PO. Alternatively, if a UE missed the reception of WUS, then the UE should monitor all the possible incoming PO. Alternatively, if a UE missed the reception of WUS, then the UE should monitor all the possible incoming PO till a successful decoding of a WUS.

Alternatively, when there is a short message to be transmitted to UE, the base station shall not transmit the WUS. Alternatively, when a UE does not successfully decode a WUS, the UE operates as a legacy UE (e.g., Rel-15 UE or Rel-16 UE). That is, a UE should wake up to monitor the possible incoming short message which is carried on PDCCH that schedules paging message. Alternatively, a short message can be carried on WUS. Alternatively, a WUS can indicate short message.

If a UE were configured with extended DRX (eDRX), then the WUS can occur with PO at the same slot. The WUS can indicate whether a UE should monitor the PO in the next one or more eDRX cycles. The WUS can indicate whether a UE should monitor the PO in the next DRX cycle (e.g., paging cycle).

Alternatively, a WUS can indicate whether the paging message is scheduled with cross-slot scheduling or not. One bit with value "1" indicates it is cross-slot scheduling. One bit with value "0" indicates it is same-slot scheduling. If it were cross-slot scheduling, a UE can stop receiving some part of PDSCH that carries paging message. It will reduce power consumption of UE.

Alternatively, the WUS is QCL with recently transmitted SSB Burst. Alternatively, the WUS is QCL with the first SSB of the recently transmitted SSB Burst. Alternatively, the WUS is QCL with the last SSB of the recently transmitted SSB Burst.

Alternatively, the WUS has a structure of two levels indication. The first level indication will indicate whether a WUS will be transmitted or not. The second level indication is a normal WUS as that above. There is a time offset (Time_Diff) between them. Alternatively, the Time_Diff is multiple of the periodicity of SSB, e.g., 40 ms, 60 ms, 80 ms. Alternatively, the first level indication will indicate whether a UE should monitor the incoming WUS or not. If a UE shall not monitor the incoming WUS, then this UE can stop receive one or more SSB. The UE can save some power consumption because of reducing the reception of SSB.

Alternatively, when a WUS is generated, the initialization factors of WUS includes SSB Index. Alternatively, when a WUS is generated, the initialization factors of DM-RS in WUS includes SSB Index. Alternatively, when a WUS is generated, the initialization factors of DM-RS in WUS includes a sub-set of SSB Index. For example, the following initialization seed $c_{init}$ is used for initialization of WUS.

$$c_{init}=(2^{10}(N_{symb}^{slot}n_{s,f}^{\mu}+l+1)(2n_{ID}+1)+n_{ID}+SSB) \bmod 2^{31}$$

wherein the $N_{symb}^{slot}$ is number of symbols within a slot, the $n_{s,f}^{\mu}$ is the slot number of the current radio frame with a SCS configuration of p. The is symbol index. The $n_{ID}$ is 0 or with the value of P-RNTI or PS-RNTI or configured by higher layer. The SSB is SSB index. Alternatively, the SSB is a sub-set of SSB index. Alternatively, the SSB is decimal number corresponding to a sub-set of SSB index.

Alternatively, for the generation of WUS, the initialization seed of scramble codes for scrambling the WUS includes SSB index. Alternatively, the scramble codes include bit scrambling codes. Alternatively, the scrambling for the WUS includes bit scrambling for the encoded bits of WUS. Alternatively, the initialization seed of scramble codes for scrambling the WUS includes a sub-set of SSB index. For example, the following initialization seed $c_{init}$ is used for initialization of scrambling codes.

$$c_{init}=(n_{RNTI}*2^{16}+n_{ID}+SSB) \bmod 2^{31} \text{ or}$$

$$c_{init}=(n_{RNTI}*2^{16}+n_{ID}+SSB*2^{26}) \bmod 2^{31}$$

wherein the $n_{RNTI}$ is 0 or with the value of P-RNTI or PS-RNTI or configured by higher layer. The $n_{RNTI}$ is 0 or configured by higher layer. The SSB is SSB index. Alternatively, the SSB is decimal number corresponding to a sub-set of SSB index.

Now, the following is a detailed example of the operation on WUS.

First, the bits of WUS to be encoded are arranged as the following:

| Block 1 | Block 2 | ... | Block N | CRC |
|---|---|---|---|---|

Wherein each block has the following structure. Wherein the IndicatorInformation will indicate the operation of UE associated with the WUS with WUS index of GroupWUSID.

IndicatorInformation+GroupWUSID

Wherein the IndicatorInformation has N_Indicator=1 bit. The GroupWUSID has N_GroupID=3 bits. There are N=8 UE groups are informed within a WUS. The length of CRC is 24. Then the total number of bits of WUS to be encoded is 56.

Secondly, the 56 bits of WUS is encoded with Polar codes. Where the CRC bits is scrambled by P-RNTI during encoding. It is assumed that the length of mother Polar codes is 512 when encoding. It is also assumed that the resource for WUS is AL=4 CCE, e.g., 4*6*12*(1−¼)=216 RE for a DM-RS density of ¼, e.g., 432 bits for QPSK modulation of WUS.

Thirdly, 432 code-word bits of WUS are scrambled in bit level. The scrambling code used for bit scrambling is initialized with the following initialization seed.

$$c_{init}=(n_{RNTI}*2^{16}+n_{ID}+SSB*2^{26}) \bmod 2^{31}$$

wherein the $n_{RNTI}$ has the value of P-RNTI and, $n_{ID}$ has the value of 0 or a value of higher layer (such as 65535) and, SSB is the SSB index (such as 1).

Fourthly, the CORESET of WUS and search space of WUS are configured for UE/UE Group. For example the CORESET 0 is used by WUS. The search space 0 (e.g., SearchSpaceZero) is used by WUS. In addition, the paging-SearchSpace that schedules paging message can be configured for WUS. Alternatively, the pagingSearchSpace that schedules paging message can be configured for WUS with different parameter(s).

Fifthly, the ith candidate CCE (e.g., start CCE index) of WUS is determined by the SSB index as the following.

$$SS(i)=(AL*(i+(A*PCI+C*SSB) \bmod G)) \bmod N\_CCE$$

wherein the SS(i) is the ith candidate of CCE (e.g., start CCE index) of WUS, AL=4, number of candidates for this AL is M=4, i=0, G=4 WUS group (or, 4 UE groups), A=65535, PCI=27, there are totally N_CCE=16 CCE in this search space, C=65537, SSB=0. Then, the 0th candidate of CCE is SS(0)=4. That is, the SS(0), SS(0)+1, SS(0)+2, SS(0)+3 CCE are the resources used by this WUS. That is, the 4th, 5th, 6th, 7th CCE are the resources used by this WUS 0.

Sixthly, the WUS above is modulated with QPSK. It will reach 432/2=216 complex values.

Seventhly, the power boosting is applied for the WUS symbols. It is assume that a 3 dB is applied for power boosting, then the 216 WUS symbols are multiplied with $\sqrt{2}$ in altitude.

Eighthly, the 216 WUS symbols are mapped on the RE of 4th, 5th, 6th, 7th CCE of WUS. Alternatively, these WUS symbols are mapped in time first then in frequency. Alternatively, these WUS symbols are mapped in time first then in frequency then in CCE index. Alternatively, these WUS symbols are mapped in time first then in frequency for all the CCE.

Ninthly, the DM-RS of WUS is generated. The total number of OFDM symbols is 4*6*12*(¼)=72 RE for a DM-RS density of ¼. Wherein the sequence initialization seed for the DM-RS of WUS is as the following.

$$c_{init}=(n_{RNTI}*2^{16}+n_{ID}+SSB*2^{26}) \bmod 2^{31}$$

or, $$c_{init}=(n_{RNTI}*2^{22}+n_{ID}*2^{6}+SSB) \bmod 2^{31}$$

wherein the $n_{RNTI}$ has the value of P-RNTI or PS-RNTI and, $n_{ID}$ has the value of 0 or a value of higher layer (such as 65533) and, SSB is the SSB index (such as 3).

Tenthly, the power boosting is applied for DM-RS of WUS. It is the same to that of WUS symbol above.

Eleventhly, the DM-RS symbols are mapped onto the RE reserved for DM-RS in the 4th, 5th, 6th, 7th CCE of WUS.

At last, the base station transmits the WUS symbols and DM-RS symbols. Alternatively, a single antenna port is applied for WUS symbols and DM-RS symbols.

Figure 4A:
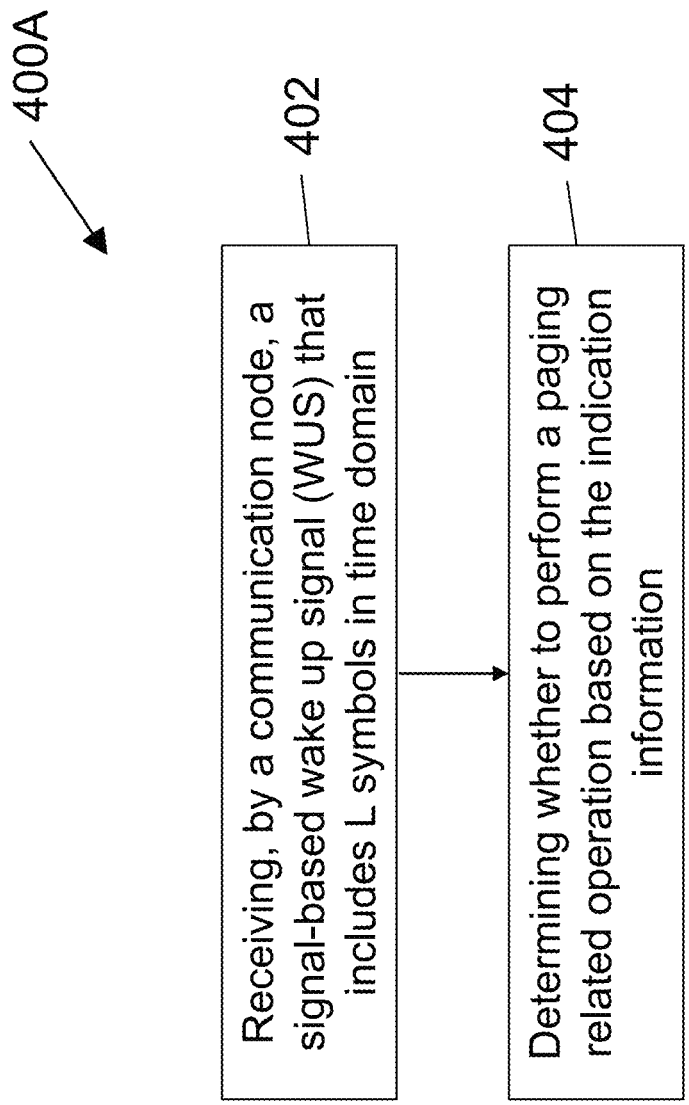
FIG. 4A shows an exemplary flowchart for a paging related power saving method for a communication node using a signal-based WUS.

FIG. 4A shows an exemplary flowchart for a paging related power saving method 400A for a communication node using a signal-based WUS. Operation 402 includes receiving, by a communication node, a signal-based wake up signal (WUS) that includes L symbols in time domain, where the signal-based WUS is associated with the communication node or with a group to which the communication node belongs, and where the signal-based WUS includes an indication information that indicates whether the communication node is triggered to monitor a paging occasion. Operation 404 includes determining whether to perform a paging related operation based on the indication information.

In some embodiments for method 400A, the L symbols include L=N_Sym_per_Slot−N_Duration_CORESET, the N_Sym_per_Slot is a number of symbols within a time slot, the N_Duration_CORESET is a number of symbols occupied by a control resource set, in the time slot without the control resource set, the N_Duration_CORESET is 0 or 3, and the signal-based WUS occupies L contiguous symbols in the time domain. In some embodiments, method 400A further comprises receiving, by the communication node, a synchronization signal block (SSB), wherein the SSB is received in response to the SSB overlapping with the signal-based WUS and in response to an absence of a transmission of the signal-based WUS, and determining that the signal-based WUS is received in response to the receiving the SSB.

In some embodiments for method 400, the signal-based WUS overlaps with channel state information reference signal (CSI-RS), overlapped resource elements (REs) on which the signal-based WUS and the CSI-RS overlap are not available for the signal-based WUS, and the overlapped REs are determined to be associated with the signal-based WUS. In some embodiments for method 400A, for the signal-based WUS, a frequency location of the signal-based WUS is aligned with a resource block (RB) or a resource block group (RBG), or a bandwidth of the signal-based WUS is less than or equal to that of a control resource set 0 (CORESET 0), or the bandwidth of the signal-based WUS is less than or equal to that of a synchronization signal block (SSB), or the bandwidth of the signal-based WUS is less than or equal to that of a secondary synchronization signal (SSS), or the bandwidth of the signal-based WUS is less than or equal to that of a downlink (DL) initial bandwidth part (BWP). In some embodiments for method 400A, a bandwidth of the signal-based WUS is equal to that of a control resource set 0 (CORESET 0) or a synchronized signal block (SSB) or a secondary synchronization signal (SSS) or a downlink initial bandwidth part (BWP) in response to the signal-based WUS having one symbol in time domain.

In some embodiments for method 400A, the signal-based WUS is generated using an initialization seed that includes a synchronization signal block (SSB) index. In some embodiments for method 400A, the initialization seed ($c_{init}$) is calculated as follows:

$$c_{init}=(N_{ID}^{cell}+1)((10n_{f\_start\_PO}+n_{s\_start\_PO})\bmod 2048+1)2^9+N_{ID}^{cell}+N_{ID}^{resource} \cdot 2^{29}+ID\_SSB,$$

wherein $n_{f\_start\_PO}$ is a radio frame number corresponding to a first paging occasion (PO), wherein $n_{s\_start\_PO}$ is a slot number corresponding to the first PO with which the signal-based WUS is associated, wherein $N_{ID}^{resource}$ is an identifier (ID) of a resource for the signal-based WUS, wherein a ID_SSB is the SSB index, and wherein $N_{ID}^{cell}$ is a physical cell ID.

In some embodiments for method 400A, the signal-based WUS is generated using the initialization seed that includes a sub-set of the SSB index. In some embodiments for method 400A, a power boosting of the signal-based WUS is determined based on a power of a synchronization signal block (SSB). In some embodiments for method 400A, the power boosting of the signal-based WUS is determined based on an energy per resource element (EPRE) of the SSB. In some embodiments for method 400A, the power boosting of the signal-based WUS is determined based on the power of the SSB at a specific sub-carrier spacing.

In some embodiments, the method 400A further includes performing a determination that another signal-based WUS is not received by the communication node; and operating, in response to the determination, the communication node as a legacy communication node in which the communication node monitors a possible incoming paging occasion. In some embodiments for method 400A, the signal-based WUS is quasi co-located (QCL) with a synchronization signal block (SSB) Burst, wherein the signal-based WUS is QCL with the SSB Burst that is scheduled for transmission, wherein the signal-based WUS is QCL with the SSB Burst received by the communication node, or wherein the signal-based WUS is QCL with the SSB Burst corresponding to the signal-based WUS and received by the communication node.

In some embodiments for method 400A, the signal-based WUS is associated with the paging occasion (PO) that uses an identical antenna port to that of a synchronization signal block (SSB), wherein the SSB corresponds to the PO. In some embodiments for method 400A, the signal-based WUS is carried on a control channel element (CCE). In some embodiments for method 400A, a length of the signal-based WUS is one or multiple times of a number of resource elements (RE) within the CCE. In some embodiments for method 400A, the signal-based WUS indicates whether a system information is changed, and the system information change is indicated on a base sequence or is indication during an initialization of the base sequence. In some embodiments for method 400A, the signal-based WUS that indicates whether the system information is changed is received by the communication node in a common WUS, and the common WUS is configured to be received by one or more communication nodes, or one or more groups of communication nodes.

Figure 4B:
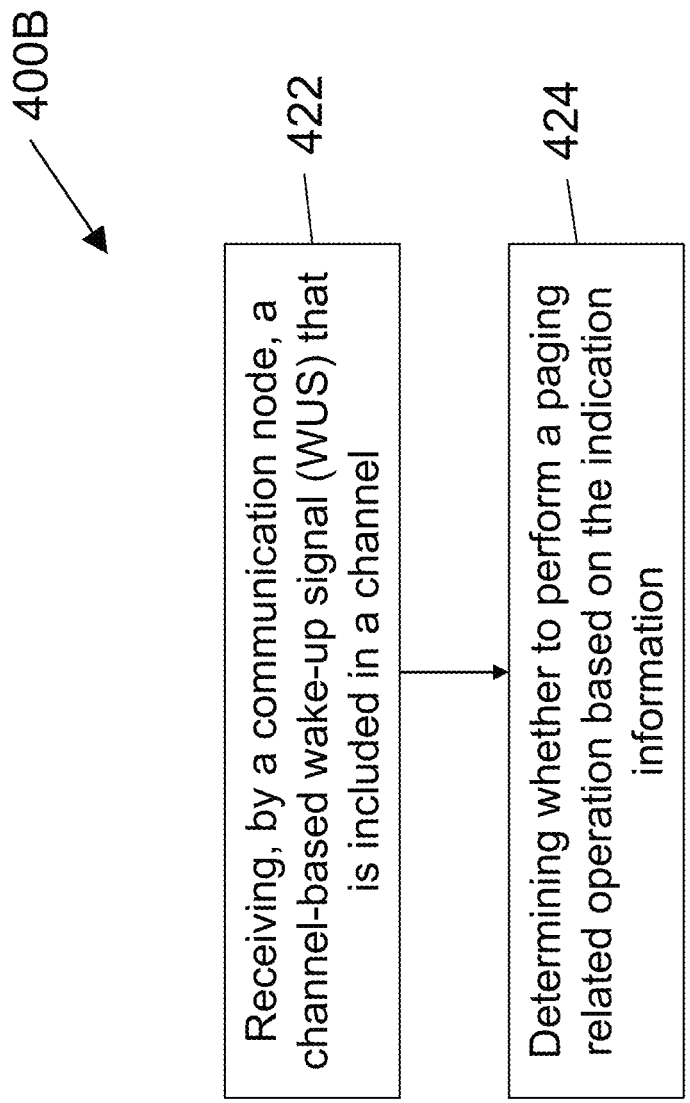
FIG. 4B shows another exemplary flowchart for a paging related power saving method for a communication node using a channel-based WUS.

FIG. 4B shows another exemplary flowchart for a paging related power saving method 400B for a communication node using a channel-based WUS. Operation 422 includes receiving, by a communication node, a channel-based wake-up signal (WUS) that is included in a channel, where the channel-based WUS is associated with the communication node or with a group to which the communication node belongs, and where the channel-based WUS includes an indication information that indicates whether the communication node is triggered to monitor a paging occasion. Operation 424 includes determining whether to perform a paging related operation based on the indication information.

In some embodiments for method 400B, for the channel-based WUS, a bandwidth of the channel-based WUS is less than or equal to that of a control resource set 0 (CORESET 0), or the bandwidth of the channel-based WUS is less than or equal to that of a downlink (DL) initial bandwidth part (BWP). In some embodiments for method 400B, for the channel-based WUS, a bandwidth of the channel-based WUS is identical to that of a control resource set 0 (CORESET 0), or the bandwidth of the channel-based WUS is identical to that of a downlink (DL) initial bandwidth part (BWP). In some embodiments for method 400B, the channel-based WUS is generated using an initialization seed that includes a synchronization signal block (SSB) index, In some embodiments for method 400B, the initialization seed includes a sub-set of the SSB Index. In some embodiments for method 400B, the initialization seed ($c_{init}$) is calculated as follows:

$$c_{init}=(n_{RNTI}*2^{22}+n_{ID}*2^6+SSB)\bmod 2^{31}$$

wherein $n_{RNTI}$ has a value of a paging radio network temporary identity (P-RNTI) or a power saving radio network temporary identity (PS-RNTI), wherein $n_{ID}$ is zero or configured by a higher layer, and wherein SSB is the SSB index.

In some embodiments for method 400B, a demodulation reference signal (DMRS) is generated for the channel that includes the channel-based WUS based on the initialization seed that includes the SSB index. In some embodiments for method 400B, the DMRS is generated for the channel using the initialization seed that includes a sub-set of the SSB index. In some embodiments for method 400B, the channel-based WUS is received in a common WUS of the channel, the common WUS is received in a search space with a lowest index, and the common WUS is configured to be received by one or more communication nodes. In some embodiments for method 400B, the common WUS is received in search space having an index of zero. In some embodiments for method 400B, a power boosting of the channel-based WUS is determined based on a power of a synchronized signal block (SSB). In some embodiments for method 400B, the power boosting of the channel-based WUS is determined based on an energy per resource element (EPRE) of the SSB. In some embodiments for method 400B, the power boosting of the channel-based WUS is determined based on the EPRE of a demodulation reference signal (DMRS) that has a power offset relative to that of the EPRE of the SSB.

In some embodiments for method 400B, the power boosting of the channel-based WUS is determined based on the power of the SSB at a specific sub-carrier spacing. In some embodiments for method 400B, the channel-based WUS is received in a pagingSearchSpace that schedules a paging message. In some embodiments, the method 400B further includes performing a determination that another channel-based WUS is not received by the communication node; and operating, in response to the determination, the communication node as a legacy communication node in which the communication node monitors a possible incoming paging occasion. In some embodiments for method 400B, the channel-based WUS is received in a common WUS that is received in a control resource set 0 (CORESET 0). In some embodiments for method 400B, a configuration of the search space for the channel-based WUS has same parameters as that of a pagingSearchSpace that schedules a paging message, except monitoringSlotPeriodicityAndOffset or search space identifier (ID).

In some embodiments for method 400B, the channel-based WUS is quasi co-located (QCL) with a synchronization signal block (SSB) burst, the channel-based WUS is QCL with the SSB Burst that is scheduled for transmission, the channel-based WUS is QCL with the SSB Burst received by the communication node, or the channel-based WUS is QCL with the SSB Burst corresponding to the channel-based WUS and received by the communication node. In some embodiments for method 400B, the channel-based WUS includes N_Indicator bits of the indication information, the indication information indicates an operation of the communication node, and the operation instructs the communication node to monitor the paging occasion, not to monitor the paging occasion, to wake up, or to continue in sleep mode.

In some embodiments for method 400B, the channel-based WUS includes a group identifier that is carried on a frozen bit of the channel-based WUS, and the frozen bit is previously known to the communication node. In some embodiments for method 400B, the channel-based WUS is associated with the paging occasion (PO) that uses an identical antenna port to that of a synchronization signal block (SSB), wherein the SSB corresponds to the PO. In some embodiments for method 400B, the channel-based WUS includes a demodulation reference signal (DMRS) that is associated with the PO. In some embodiments for method 400B, the channel-based WUS includes a resource identifier that is related to a control channel element (CCE) number. In some embodiments for method 400B, the channel-based WUS includes a resource identifier that is related to a physical cell identifier. In some embodiments for method 400B, the channel-based WUS includes a start CCE number (CCE_Start) according to a following equation: CCE_Start=mod((AL·(ResourceID+A·PCI)), N_CCE) wherein the CCE_Start is the start CCE number of a resource used by the channel-based WUS, wherein AL is an aggregation level of the CCE, wherein ResourceID is the resource identifier that the channel-based WUS uses, and wherein N_CCE is a total number of CCE of a search space that the channel-based WUS uses.

In some embodiments for method 400B, the channel-based WUS includes an indication of whether a system information is changed, and the indication related to the system information is included in a common WUS received by the communication node. In some embodiments for method 400B, the channel-based WUS has a following block structure:

| Block 1 | Block 2 | ... | Block N | CRC |
| --- | --- | --- | --- | --- | wherein N blocks are supported, wherein the N blocks includes N groups of communication nodes configured to receive the channel-based WUS, wherein each block includes an IndicatorInformation that indicates an operation of the communication node and a GroupWUSID that includes a group identifier for one or more communication nodes, and wherein the IndicatorInformation is associated with an index of the GroupWUSID. In some embodiments for method 400B, the IndicatorInformation having a value of 1 indicates to the communication node or a group of communication nodes to monitor an incoming paging occasion.

Figure 4C:
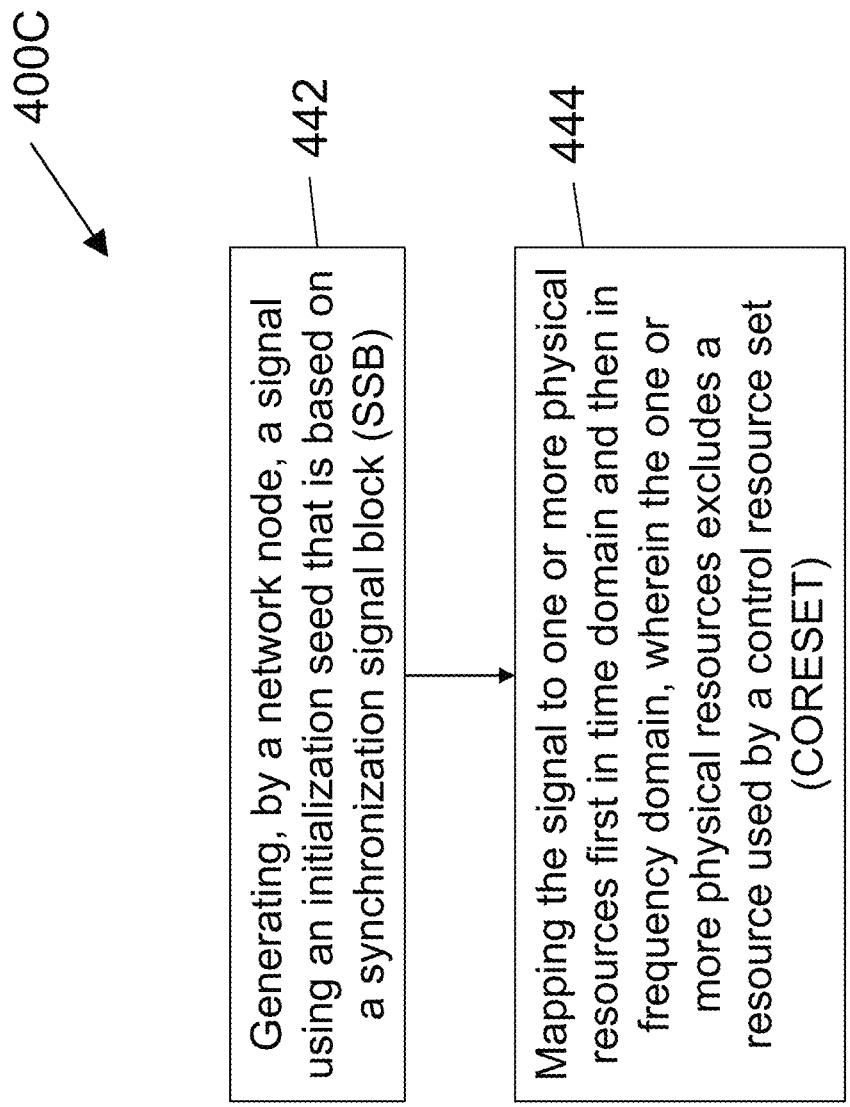
FIG. 4C shows an exemplary flowchart for a paging related power saving method for a network node using a signal-based WUS.

FIG. 4C shows an exemplary flowchart for a paging related power saving method 400C for a network node using a signal-based WUS. Operation 442 includes generating, by a network node, a signal (e.g., a signal-based WUS) using an initialization seed that is based on a synchronization signal block (SSB). Operation 444 includes mapping the signal to one or more physical resources first in time domain and then in frequency domain, wherein the one or more physical resources excludes a resource used by a control resource set (CORESET).

In some embodiments for method 400C, the signal is not transmitted but is counted as a transmission of the signal in response to determining that the signal overlaps with a transmission of the SSB. In some embodiments for method 400C, the initialization seed (cinit) is calculated using a following equation:

$$c_{init}=(N_{ID}^{cell}+1)((10n_{f\_start\_PO}+n_{s\_start\_PO})\bmod 2048+1)2^9+N_{ID}^{cell}+N_{ID}^{resource}\cdot 2^{29}+\text{ID\_SSB},$$

wherein $n_{f\_start\_PO}$ is a radio frame number corresponding to a first paging occasion (PO), wherein $n_{s\_start\_PO}$ is a slot number corresponding to the first PO with which the signal is associated, wherein $N_{ID}^{resource}$ is an identifier of a resource for the signal, wherein ID_SSB is an SSB index, and wherein $N_{ID}^{cell}$ is a physical cell identifier.

In some embodiments for method 400C, the signal is generated using the initialization seed that includes a SSB index, or the signal is generated using the initialization seed that includes a sub-set of the SSB index. In some embodiments for method 400C, the signal includes a resource identifier (ID) of a resource that the signal uses, or the signal includes a group ID of a group to which one or more communication nodes belong, or wherein the signal includes a power boosting information of the signal. In some embodiments for method 400C, a power boosting of the signal is determined based on a power of the SSB.

In some embodiments for method 400C, the power boosting of the signal is determined based on an energy per resource element (EPRE) of the SSB. In some embodiments for method 400C, the power boosting of the signal is determined based on the power of SSB at a specific sub-carrier spacing. In some embodiments for method 400C, the signal is generated using a root value that is generated based on a group identifier of a group to which one or more communication nodes belong. In some embodiments for method 400C, the signal is generated using a root value that is generated based on a resource identifier of the one or more physical resources that the signal uses. In some embodiments for method 400C, the signal indicates whether a system information is changed, and the system information change is indicated on a base sequence or is indication during an initialization of the base sequence.

In some embodiments, the method 400C further includes performing a first determination that the signal overlaps with a transmission of channel state information reference signal (CSI-RS); and performing a second determination that overlapped resource elements (REs) on which the signal and the CSI-RS overlap are not available for the signal. In some embodiments, the method 400C further includes determining that the signal is not to be transmitted in response to determining that the signal overlaps with a transmission of a physical downlink shared channel (PDSCH) carrying a system information (SI), wherein an absence of a transmission of the signal is determined as a transmission of the signal.

Figure 4D:
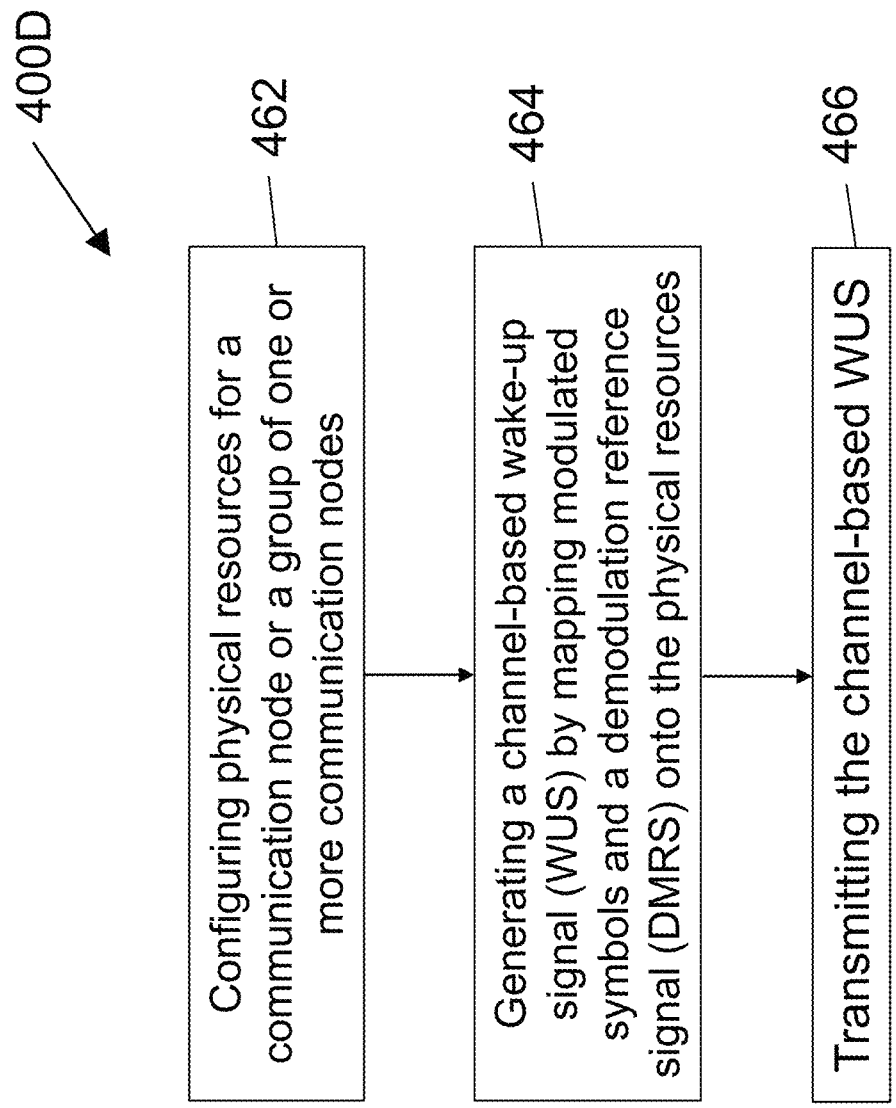
FIG. 4D shows another exemplary flowchart for a paging related power saving method for a communication node using a channel-based WUS.

FIG. 4D shows another exemplary flowchart for a paging related power saving method 400D for a communication node using a channel-based WUS. Operation 462 includes configuring physical resources for a communication node or a group of one or more communication nodes, where the physical resources include a control resource set (CORESET), a search space, and a control channel element (CCE). Operation 464 includes generating a channel-based wake-up signal (WUS) by mapping modulated symbols and a demodulation reference signal (DMRS) onto the physical resources, where the modulated symbols include an indication information that indicates whether the communication node or the one or more communication nodes are triggered to monitor a paging occasion. Operation 466 includes transmitting the channel-based WUS.

In some embodiments for method 400D, the channel-based WUS has a following block structure:

| Block 1 | Block 2 | ... | Block N | CRC |
|---------|---------|-----|---------|-----| wherein N blocks are supported, wherein the N blocks includes N groups of the one or more communication nodes configured to receive the channel-based WUS, wherein each block includes an IndicatorInformation that indicates an operation of the communication node and a GroupWUSID that includes a group identifier for one or more communication nodes, and wherein the IndicatorInformation is associated with an index of the GroupWUSID.

In some embodiments for method 400D, the indication information includes one bit that indicates whether the communication node or whether the one or more communication nodes are expected to monitor the paging occasion. In some embodiments for method 400D, the modulated symbols are obtained by performing a bit scrambling operation in which encoded bits that include the indication information are scrambled using a bit scrambling code, wherein the bit scrambling code is generated using an initialization seed that includes a synchronization signal (SSB) index. In some embodiments for method 400D, the initialization seed includes a sub-set of the SSB index. In some embodiments for method 400D, the initialization seed (cinit) is calculated using a following equation:

$$c_{init} = (n_{RNTI} * 2^{16} + n_{ID} + SSB * 2^{26}) \mod 2^{31},$$

wherein $n_{RNTI}$ has a value of a paging radio network temporary identity (P-RNTI) or a power saving radio network temporary identity (PS-RNTI), wherein $n_{ID}$ is zero or configured by higher layer, and wherein SSB is the SSB index.

Figure 5:
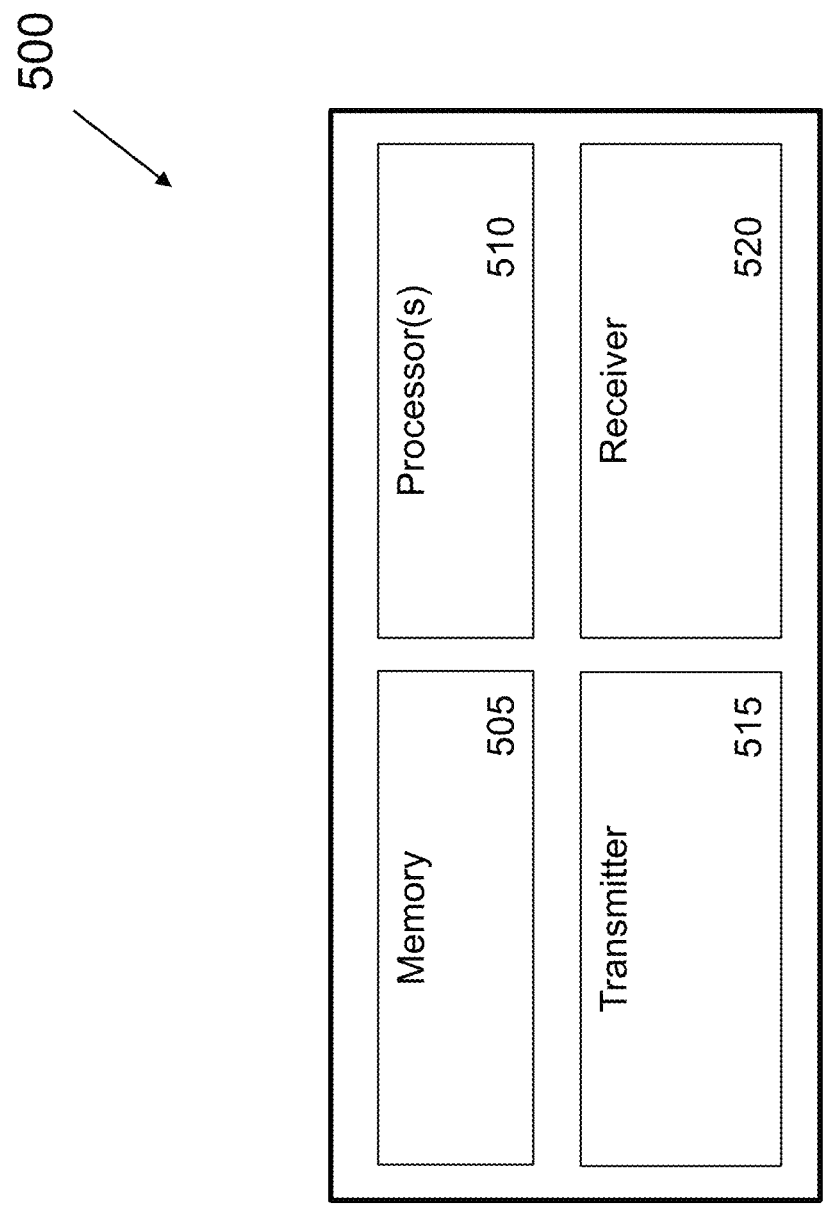
FIG. 5 shows an exemplary block diagram of a hardware platform 500 that may be a part of a network node or a user equipment.

In some embodiments for method 400D, the generating the DMRS for the channel-based WUS includes generating the DMRS based on an initialization seed that includes a synchronization signal block (SSB) index. In some embodiments for method 400D, the initialization seed includes a sub-set of the SSB index. In some embodiments for method 400D, the CCE is determined based on a group identifier of the group to which the one or more communication nodes belong FIG. 5 shows an exemplary block diagram of a hardware platform 500 that may be a part of a network node or a user equipment. The hardware platform 500 includes at least one processor 510 and a memory 505 having instructions stored thereupon. The instructions upon execution by the processor 510 configure the hardware platform 500 to perform the operations described in FIGS. 1 to 4D and in the various embodiments described in this patent document. The transmitter 515 transmits or sends information or data to another node. For example, a network node transmitter can send a paging message to a user equipment. The receiver 520 receives information or data transmitted or sent by another node. For example, a user equipment can receive a paging message from a network node.

In this document the term "exemplary" is used to mean "an example of" and, unless otherwise stated, does not imply an ideal or a preferred embodiment. In this document, the term "alternatively" is used to mean that in some embodiments the described techniques are performed, and unless otherwise stated, does not imply that the describes techniques are mutually exclusive and cannot be combined.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
   receiving, by a communication node, a channel-based wake-up signal (WUS) that is included in a channel,
   wherein the channel-based WUS is associated with the communication node or with a group to which the communication node belongs,
   wherein the channel-based WUS includes an indication information that indicates whether the communication node is triggered to monitor a paging occasion,
   wherein the channel-based WUS has a following block structure:

| Block 1 | Block 2 | ... | Block N | CRC |
|---------|---------|-----|---------|-----| wherein N blocks are supported,
      wherein the N blocks include N groups of communication nodes configured to receive the channel-based WUS,
      wherein each block includes an IndicatorInformation that indicates an operation of one communication node and a GroupWUSID that includes a group identifier for one or more communication nodes, and
      wherein the IndicatorInformation is associated with an index of the GroupWUSID; and
   determining whether to perform a paging related operation based on the indication information.

2. The method of claim 1, wherein the channel-based WUS is received in search space having an index of zero.

3. The method of claim 1, wherein the channel-based WUS is received in a pagingSearchSpace that schedules a paging message.

4. The method of claim 1, wherein the channel-based WUS is received in a WUS that is received in a control resource set 0 (CORESET 0).

5. The method of claim 1, wherein the channel-based WUS includes an indication of whether a system information is changed, and
   wherein the indication related to the system information is included in a common WUS received by the communication node.

6. The method of claim 1, wherein the IndicatorInformation having a value of 1 indicates to the communication node or a group of communication nodes to monitor an incoming paging occasion.

7. The method of claim 1, an aggregation level (AL) of a search space for the channel-based WUS is 4, 8, or 16, and wherein a corresponding number of one or more candidates for the AL are 4, 2, or 1.

8. The method of claim 1,
   wherein the channel-based WUS carrying the indication information related to the paging occasion is transmitted or received as a physical downlink control channel (PDCCH) within a search space that is configured for the channel-based WUS,
   wherein the channel-based WUS is associated with N search spaces, and
   wherein N is a positive integer.

9. The method of claim 1, wherein the channel-based WUS is transmitted or received in a search space with an index other than zero.

10. The method of claim 1, wherein a downlink control information (DCI) of the channel-based WUS is associated with a new radio network temporary identifier (RNTI) that is different than that associated with another DCI that schedules a paging message.

11. The method of claim 10, wherein the RNTI for the channel-based WUS includes a value whose first three hex numbers are 0xFFF.

12. A communication node for wireless communication comprising one or more processors, configured to cause the communication node to:
   receive a channel-based wake-up signal (WUS) that is included in a channel,
      wherein the channel-based WUS is associated with the communication node or with a group to which the communication node belongs,
      wherein the channel-based WUS includes an indication information that indicates whether the communication node is triggered to monitor a paging occasion,
      wherein the channel-based WUS has a following block structure:

| Block 1 | Block 2 | ... | Block N | CRC |
|---------|---------|-----|---------|-----| wherein N blocks are supported,
      wherein the N blocks include N groups of communication nodes configured to receive the channel-based WUS,
      wherein each block includes an IndicatorInformation that indicates an operation of one communication node and a GroupWUSID that includes a group identifier for one or more communication nodes, and wherein the IndicatorInformation is associated with an index of the GroupWUSID; and determine whether to perform a paging related operation based on the indication information.

13. A wireless communication method, comprising:

configuring physical resources for a communication node or a group of one or more communication nodes, wherein the physical resources include a control resource set (CORESET), a search space, and a control channel element (CCE);

generating a channel-based wake-up signal (WUS) by mapping modulated symbols and a demodulation reference signal (DMRS) onto the physical resources, wherein the channel-based WUS is associated with the communication node or with a group to which the communication node belongs, wherein the modulated symbols include an indication information that indicates whether the communication node or the one or more communication nodes are triggered to monitor a paging occasion, wherein the channel-based WUS has a following block structure:

| Block 1 | Block 2 | ... | Block N | CRC |
|---------|---------|-----|---------|-----| wherein N blocks are supported, wherein the N blocks include N groups of the one or more communication nodes configured to receive the channel-based WUS, wherein each block includes an IndicatorInformation that indicates an operation of one communication node and a GroupWUSID that includes a group identifier for one or more communication nodes, and wherein the IndicatorInformation is associated with an index of the GroupWUSID; and transmitting the channel-based WUS.

14. The method of claim 13, an aggregation level (AL) of a search space for the channel-based WUS is 4, 8, or 16, and wherein a corresponding number of one or more candidates for the AL are 4, 2, or 1.

15. The method of claim 13, wherein the channel-based WUS carrying the indication information related to the paging occasion is transmitted or received as a physical downlink control channel (PDCCH) within a search space that is configured for the channel-based WUS, wherein the channel-based WUS is associated with N search spaces, and wherein N is a positive integer.

16. The method of claim 13, wherein the channel-based WUS is transmitted or received in a search space with an index other than zero.

17. The method of claim 13, wherein a downlink control information (DCI) of the channel-based WUS is associated with a new radio network temporary identifier (RNTI) that is different than that associated with another DCI that schedules a paging message.

18. The method of claim 13, wherein the RNTI for the channel-based WUS includes a value whose first three hex numbers are 0xFFF.

19. An apparatus for wireless communication comprising one or more processors, configured to cause the apparatus to:

configure physical resources for a communication node or a group of one or more communication nodes, wherein the physical resources include a control resource set (CORESET), a search space, and a control channel element (CCE);

generate a channel-based wake-up signal (WUS) by mapping modulated symbols and a demodulation reference signal (DMRS) onto the physical resources, wherein the channel-based WUS is associated with the communication node or with a group to which the communication node belongs, wherein the modulated symbols include an indication information that indicates whether the communication node or the one or more communication nodes are triggered to monitor a paging occasion, wherein the channel-based WUS has a following block structure:

| Block 1 | Block 2 | ... | Block N | CRC |
|---------|---------|-----|---------|-----| wherein N blocks are supported, wherein the N blocks include N groups of the one or more communication nodes configured to receive the channel-based WUS, wherein each block includes an IndicatorInformation that indicates an operation of one communication node and a GroupWUSID that includes a group identifier for one or more communication nodes, and wherein the IndicatorInformation is associated with an index of the GroupWUSID; and transmit the channel-based WUS.

20. The communication node of claim 12, wherein the IndicatorInformation having a value of 1 indicates to the communication node or a group of communication nodes to monitor an incoming paging occasion.

21. The apparatus of claim 19, wherein the IndicatorInformation having a value of 1 indicates to the communication node or a group of communication nodes to monitor an incoming paging occasion.

* * * * *